US009521859B2

(12) United States Patent
DeWille et al.

(10) Patent No.: US 9,521,859 B2
(45) Date of Patent: *Dec. 20, 2016

(54) SUBSTANTIALLY CLEAR NUTRITIONAL LIQUIDS COMPRISING CALCIUM HMB AND SOLUBLE PROTEIN

(76) Inventors: Normanella T. DeWille, Columbus, OH (US); Kelley J. Lowe, Powell, OH (US); Terrence B. Mazer, New Albany, OH (US); Paul W. Johns, Columbus, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/151,911

(22) Filed: Jun. 2, 2011

(65) Prior Publication Data

US 2011/0305799 A1 Dec. 15, 2011

Related U.S. Application Data

(60) Provisional application No. 61/353,400, filed on Jun. 10, 2010.

(51) Int. Cl.
*A23L 1/305* (2006.01)
*A23L 2/52* (2006.01)
*A23L 2/66* (2006.01)

(52) U.S. Cl.
CPC ... *A23L 2/52* (2013.01); *A23L 2/66* (2013.01)

(58) Field of Classification Search
None
See application file for complete search history.

(56) References Cited

U.S. PATENT DOCUMENTS

| | | | |
|---|---|---|---|
| 3,105,763 A | 10/1963 | North et al. | |
| 3,408,210 A | 10/1968 | Heyman | |
| 3,542,560 A | 11/1970 | Tomarelli et al. | |
| 4,104,290 A | 8/1978 | Koslowsky | |
| 4,259,358 A | 3/1981 | Duthie | |
| 4,742,081 A | 5/1988 | Stracher et al. | |
| 4,992,470 A | 2/1991 | Nissen | |
| 5,000,975 A | 3/1991 | Tomarelli | |
| 5,028,440 A | 7/1991 | Nissen | |
| 5,087,472 A | 2/1992 | Nissen | |
| 5,167,957 A | 12/1992 | Webb, Jr. et al. | |
| 5,171,442 A | 12/1992 | Nakshbendi | |
| 5,219,735 A | 6/1993 | Brule et al. | |
| 5,223,285 A | 6/1993 | DeMichele et al. | |
| 5,348,979 A * | 9/1994 | Nissen et al. | 514/557 |
| 5,360,613 A | 11/1994 | Nissen | |
| 5,374,657 A | 12/1994 | Kyle | |
| 5,431,928 A | 7/1995 | Saito et al. | |
| 5,444,054 A | 8/1995 | Garleb et al. | |
| 5,447,732 A | 9/1995 | Tanimoto et al. | |
| 5,457,130 A | 10/1995 | Tisdale et al. | |
| 5,492,938 A | 2/1996 | Kyle et al. | |
| 5,550,156 A | 8/1996 | Kyle | |
| 5,601,860 A | 2/1997 | Lien et al. | |
| 5,641,531 A * | 6/1997 | Liebrecht et al. | 426/583 |
| 5,726,146 A | 3/1998 | Almada et al. | |
| 5,780,451 A | 7/1998 | DeMichele et al. | |
| 5,834,427 A * | 11/1998 | Han et al. | 514/5.5 |
| 5,976,550 A | 11/1999 | Engel et al. | |
| 6,031,000 A | 2/2000 | Nissen et al. | |
| 6,060,446 A | 5/2000 | Zaloga et al. | |
| 6,080,788 A | 6/2000 | Sole et al. | |
| 6,096,358 A | 8/2000 | Murdick et al. | |
| 6,099,871 A | 8/2000 | Martinez | |
| 6,103,764 A | 8/2000 | Nissen | |
| 6,227,261 B1 | 5/2001 | Das et al. | |
| 6,248,909 B1 | 6/2001 | Akimoto et al. | |
| 6,291,525 B1 | 9/2001 | Nissen | |
| 6,294,206 B1 | 9/2001 | Barrett-Reis et al. | |
| 6,306,908 B1 | 10/2001 | Carlson et al. | |
| 6,340,491 B1 | 1/2002 | Cain et al. | |
| 6,365,218 B1 | 4/2002 | Borschel et al. | |
| 6,371,319 B2 | 4/2002 | Yeaton et al. | |
| 6,420,342 B1 | 7/2002 | Hageman et al. | |
| 6,468,987 B1 | 10/2002 | Demichele et al. | |
| 6,475,539 B1 * | 11/2002 | DeWille et al. | 426/72 |
| 6,521,591 B1 | 2/2003 | Smeets et al. | |
| 6,589,576 B2 | 7/2003 | Borschel et al. | |
| 6,596,767 B2 | 7/2003 | Masor et al. | |

(Continued)

FOREIGN PATENT DOCUMENTS

| | | |
|---|---|---|
| AU | 2006331950 A1 | 7/2007 |
| CA | 2632262 A1 | 7/2007 |
| CA | 2784605 | 6/2011 |
| CA | 2737972 | 10/2012 |
| CN | 1307478 | 8/2001 |
| CN | 101569412 | 11/2009 |
| CN | 101574146 | 11/2009 |
| CN | 101703246 | 5/2010 |
| DE | 29707308 | 6/1997 |
| DE | 29709313 U1 | 9/1997 |

(Continued)

OTHER PUBLICATIONS

O. de Rham and S. Chanton, "Role of Ionic Envirnonment in INsolubilization of Whey Protein During Heat Treatment of Whey Products", Journal of Dairy Science vol. 67, Issue 5, pp. 939-949.*
Ballard et al., "Effect of I-glutamine supplementation on impaired glucose regulation during intravenous lipid administration," Nutrition, vol. 12(5), pp. 349-354 (1996).
Clinical Infectious Diseases, vol. 25(2), p. 457 (1997).
Elam et al., "Effects of arginine and ornithine on strength, lean body mass and urinary hydroxyproline in adult males," The Journal of Sports Medicine and Physical Fitness, vol. 29(1), pp. 52-56 (1989).

(Continued)

*Primary Examiner* — Tamra L Dicus

(57) ABSTRACT

Disclosed are substantially clear nutritional liquids comprising protein and calcium HMB wherein soluble protein represents from about 65% to 100% by weight of total protein. The liquids have a pH of from about 2.8 to about 4.6 and may be manufactured as a hot fill product. The substantially clear nutritional liquids may also have a weight ratio of calcium HMB to soluble calcium of from 4.5:1 to 7.3:1. In some embodiments, the substantially clear nutritional liquids are substantially free of fat, and may optionally include isomaltulose and/or beta alanine.

13 Claims, No Drawings

(56) References Cited

U.S. PATENT DOCUMENTS

| | | | |
|---|---|---|---|
| 6,620,427 B2 | 9/2003 | Lasekan et al. | |
| 6,660,258 B1 | 12/2003 | Tovey | |
| 6,749,881 B2 | 6/2004 | Kataoka et al. | |
| 7,247,320 B2* | 7/2007 | Jost | 424/535 |
| 7,332,178 B2 | 2/2008 | Byard et al. | |
| 7,419,596 B2 | 9/2008 | Dueppen et al. | |
| 7,435,442 B2 | 10/2008 | Servotte | |
| 7,445,807 B2 | 11/2008 | Lockwood | |
| 7,498,026 B2 | 3/2009 | Dahlqvist et al. | |
| 7,517,850 B2* | 4/2009 | Holt | 514/1.1 |
| 7,648,721 B2* | 1/2010 | Edens et al. | 426/34 |
| 7,795,204 B2 | 9/2010 | Gardiner et al. | |
| 7,825,084 B2 | 11/2010 | Harris et al. | |
| 8,217,077 B2 | 7/2012 | Baxter et al. | |
| 8,916,217 B2* | 12/2014 | Johns et al. | 426/106 |
| 2001/0008641 A1 | 7/2001 | Krotzer | |
| 2002/0035965 A1 | 3/2002 | Uni et al. | |
| 2003/0092609 A1 | 5/2003 | Larsen et al. | |
| 2003/0118703 A1 | 6/2003 | Nguyen et al. | |
| 2003/0165604 A1 | 9/2003 | Tsubaki et al. | |
| 2004/0013787 A1 | 1/2004 | Theuer | |
| 2004/0048925 A1 | 3/2004 | Wiley et al. | |
| 2004/0071825 A1 | 4/2004 | Lockwood | |
| 2004/0106678 A1 | 6/2004 | Dobbins et al. | |
| 2004/0122210 A1 | 6/2004 | Thim et al. | |
| 2004/0202770 A1 | 10/2004 | Cain et al. | |
| 2004/0220266 A1* | 11/2004 | Wiley et al. | 514/557 |
| 2004/0237466 A1 | 12/2004 | Grossmann et al. | |
| 2004/0247755 A1 | 12/2004 | Doetsch et al. | |
| 2004/0248771 A1 | 12/2004 | Raggi | |
| 2005/0075280 A1 | 4/2005 | Larsen et al. | |
| 2005/0106219 A1 | 5/2005 | Bortlik et al. | |
| 2005/0215640 A1 | 9/2005 | Baxter et al. | |
| 2005/0249650 A1 | 11/2005 | Damhuis et al. | |
| 2006/0024385 A1 | 2/2006 | Pedersen | |
| 2006/0193961 A1 | 8/2006 | Shastri et al. | |
| 2006/0204632 A1 | 9/2006 | Barrett-Reis et al. | |
| 2006/0286210 A1 | 12/2006 | Rangavajla et al. | |
| 2006/0293220 A1* | 12/2006 | Holt | 514/7 |
| 2007/0093553 A1* | 4/2007 | Baxter et al. | 514/557 |
| 2007/0125785 A1 | 6/2007 | Robinson et al. | |
| 2007/0142469 A1* | 6/2007 | Thomas | A61K 31/19 514/557 |
| 2007/0219146 A1 | 9/2007 | Bhaskaran et al. | |
| 2008/0031860 A1 | 2/2008 | Hageman | |
| 2008/0058415 A1 | 3/2008 | Shulman et al. | |
| 2008/0063765 A1* | 3/2008 | Barbano | A23C 9/1422 426/330.2 |
| 2008/0119552 A1 | 5/2008 | Navarro | |
| 2008/0193624 A1 | 8/2008 | Shulman et al. | |
| 2008/0194407 A1* | 8/2008 | Ashmead et al. | 504/126 |
| 2008/0209864 A1 | 9/2008 | Fergusson et al. | |
| 2008/0254153 A1 | 10/2008 | Wang et al. | |
| 2008/0260923 A1 | 10/2008 | Kratky et al. | |
| 2008/0274230 A1 | 11/2008 | Johns et al. | |
| 2008/0305531 A1 | 12/2008 | Lam et al. | |
| 2008/0317886 A1 | 12/2008 | Sparkman | |
| 2009/0087540 A1 | 4/2009 | Haschke et al. | |
| 2009/0110674 A1* | 4/2009 | Loizou | 424/94.2 |
| 2009/0142425 A1 | 6/2009 | Jager et al. | |
| 2009/0181148 A1* | 7/2009 | Saggin | A23C 3/03 426/590 |
| 2009/0220637 A1* | 9/2009 | Roessle | 426/2 |
| 2009/0263367 A1 | 10/2009 | Foley | |
| 2010/0074969 A1 | 3/2010 | Hughes et al. | |
| 2010/0179112 A1* | 7/2010 | Rathmacher et al. | 514/167 |
| 2011/0218244 A1* | 9/2011 | Kneller | 514/551 |
| 2011/0250322 A1* | 10/2011 | Johns et al. | 426/106 |
| 2011/0256272 A1 | 10/2011 | Johns et al. | |
| 2011/0256297 A1 | 10/2011 | Johns | |
| 2011/0256299 A1 | 10/2011 | Helmke | |
| 2011/0256301 A1* | 10/2011 | Kensler et al. | 426/613 |
| 2012/0258209 A1 | 10/2012 | Ulstad | |
| 2012/0283185 A1 | 11/2012 | Whyte | |

FOREIGN PATENT DOCUMENTS

| | | |
|---|---|---|
| DE | 10145818 C1 | 10/2002 |
| EP | 0036663 | 9/1981 |
| EP | 0367724 A1 | 5/1990 |
| EP | 0385859 A1 | 9/1990 |
| EP | 0756827 A2 | 2/1997 |
| EP | 698078 | 8/1997 |
| EP | 0637239 B1 | 8/1999 |
| EP | 1762147 | 3/2007 |
| EP | 1968564 A2 | 9/2008 |
| EP | 2082738 A1 | 7/2009 |
| EP | 2461704 | 10/2013 |
| IN | 200800657 | 9/2009 |
| JP | 05503508 A | 6/1993 |
| JP | 7507569 T | 8/1995 |
| JP | 9121809 A | 5/1997 |
| JP | 11508282 T | 7/1999 |
| JP | 2001288107 A | 10/2001 |
| JP | 2002518440 A | 6/2002 |
| JP | 2002521428 A | 7/2002 |
| JP | 2003137790 A | 5/2003 |
| JP | 2006136318 | 6/2006 |
| JP | 2009155336 A | 7/2009 |
| WO | 9406417 A1 | 3/1994 |
| WO | 9414429 A1 | 7/1994 |
| WO | 9739749 A2 | 10/1997 |
| WO | 9804253 A1 | 2/1998 |
| WO | 9966917 A2 | 12/1999 |
| WO | 0006134 A2 | 2/2000 |
| WO | 0015174 A2 | 3/2000 |
| WO | 0107091 | 2/2001 |
| WO | 0156402 | 8/2001 |
| WO | 0158284 | 8/2001 |
| WO | 01/77271 A2 | 10/2001 |
| WO | 0217735 | 3/2002 |
| WO | 03053456 | 7/2003 |
| WO | 03091214 | 11/2003 |
| WO | 2004064715 A2 | 8/2004 |
| WO | 2005000315 | 1/2005 |
| WO | 2005102301 A2 | 11/2005 |
| WO | 2006062424 A2 | 6/2006 |
| WO | 2007066232 | 6/2007 |
| WO | 2007075605 A2 | 7/2007 |
| WO | 2007098092 | 8/2007 |
| WO | 2008115723 | 9/2008 |
| WO | 2008115723 A1 | 9/2008 |
| WO | 2009/143097 A1 | 11/2009 |
| WO | 2011074995 A1 | 6/2011 |
| WO | 2011094544 | 8/2011 |
| WO | 2011094548 | 8/2011 |
| WO | 2011094549 | 8/2011 |
| WO | 2011094551 | 8/2011 |
| WO | 2011094557 | 8/2011 |
| WO | 2011156238 | 12/2011 |
| WO | 2012088075 | 6/2012 |
| WO | 2012097064 | 7/2012 |
| WO | 2012109105 | 8/2012 |
| WO | 2012112419 | 8/2012 |

OTHER PUBLICATIONS

Fligger et al., "Arginine Supplementation Increases Weight Gain, Depresses Antibody Production, and Alters Circulating Leukocyte Profiles in Preruminant Calves Without Affecting Plasma Growth Hormone Concentrations," J. Anim. Sci., vol. 75, pp. 3019-3025 (1997).

Jarowski et al., "Utility of Fasting Essential Amino Acid Plasma Levels in Formulation of Nutritionally Adequate Diets III: Lowering of Rat Serum Cholesterol Levels by Lysine Supplementation," Journal of Pharmaceutical Sciences, vol. 64(4), pp. 690-691 (1975).

Office Action issued in Chinese Application No. 200580009596.0, dated Jun. 9, 2011.

Office Action issued in Japanese Application No. 2000-555603, dated Jan. 12, 2010.

Office Action issued in Japanese Application No. 2000-555603, dated Feb. 15, 2011.

(56) References Cited

OTHER PUBLICATIONS

Office Action issued in Japanese Application No. 2000-555603, dated Oct. 25, 2011.
Office Action issued in Philippines Application No. 12006501893, dated Oct. 11, 2011.
Campbell, et al., "Allergic humans are hyporesponsive to a CXCR3 ligand-mediated Th1 immunity-promoting loop," The FASEB Journal, vol. 18, pp. 329-331 (2004).
Hauber, et al., "Expression of interleukin-4, interleukin-9 and interleukin-13 in peripheral blood mononuclear cells of cystic fibrosis patients with and without allergy," EXCLI Journal, vol. 5, pp. 209-216 (2006).
Office Action issued in Canadian Patent Application No. 2,560,042, dated Nov. 14, 2011.
Office Action issued in Russian Application No. 2008129605, dated Aug. 12, 2011.
Merck Manual, "Starving and Wasting," 16th Ed., pp. 919-920 (1995).
Office Action issued in U.S. Appl. No. 13/016,005, dated Jan. 27, 2012.
Office Action issued in U.S. Appl. No. 13/016,041, dated Feb. 3, 2012.
Office Action issued in U.S. Appl. No. 11/025,466, dated Feb. 10, 2012.
European Search Report for Application No. 11187274.3-1216, dated Feb. 15, 2012.
Kritchevsky, "An international symposium on cancer cachexia, cytokines, and EPA: Introduction," Nutrition, Elsevier Inc., U.S., vol. 12(1), p. S1 (1996).
Notice of Preliminary Rejection for Korean Application No. 10-2006-7022383, dated Feb. 13, 2012.
First Hearing Notice in Indian Application No. 1372/MUMNP/2008, dated Nov. 4, 2011.
Second Hearing Notice in Indian Application No. 1372/MUMNP/2008, dated Mar. 10, 2012.
Tisdale et al., "Inhibition of lipolysis and muscle protein degradation by epa in cancer cachexia," Nutrition, Elsevier Inc., U.S., vol. 12(1), pp. S31-33 (1996).
Zuljdgeest-Van Leeuwen et al, "Inhibition of lipolysis by eicosapentaenoic acid in weight-losing cancer patients and healthy volunteers," Clinical Nutrition, Churchill Livingstone, London, G.B., vol. 17, p. 13 (1998).
Kreider, et al., "Effect of Calcium Beta-Hydroxy-Beta-Methylbutyrate (HMB) Supplementation During Resistance—Training on Markers of Catabolism, Body Composition and Strength," International Journal of Sports Medicine, vol. 20, No. 8, pp. 503-509 (Nov. 1, 1999).
International Search Report and Written Opinion for PCT/US2011/022928 (May 23, 2011).
International Search Report and Written Opinion for PCT/US2011/022932 (May 23, 2011).
International Search Report and Written Opinion for PCT/US2011/022938 (May 23, 2011).
International Search Report and Written Opinion for PCT/US2011/022947 (May 23, 2011).
International Search Report and Written Opinion for PCT/US2011/022935 (May 23, 2011).
de Maat, et al., "Inflammation, Thrombosis and Atherosclerosis: Results of the Glostrup Study," Journal of Thrombosis and Haemostasis, 2003, vol. 1, No. 5, p. 950-957.
Choi, et al., "Hematein inhibits atherosclerosis by inhibition of reactive oxygen generation and NF-kappaB-dependent inflammatory mediators in hyperlipidemic mice," Journal of Cardiovascular Pharmacology, 2003, vol. 42, No. 2, p. 287-295.
May, Patricia Eubanks, "Reversal of cancer-related wasting using oral supplementation with a combination of beta-hydroxy-beta-beta-methylbutyrate, arginine, and glutamine," American Journal of Surgery, 2002, vol. 183, No. 4, p. 471-479.
European Search Report and Opinion for Application No. 10186645.7-1216, dated Feb. 14, 2011.

Office Action from Indian Patent Application No. 1372/MUMNP/2008, dated Sep. 23, 2010.
Office Action issued in Taiwan Application No. 094109357, dated Jun. 24, 2011.
Sult, "Th1/Th2 Balance: A Natural Therapeutic Approach to Th2 Polarization in Allergy," Applied Nutritional Science Reports, 2003, p. 1-8.
AIDS Alert, 1999, vol. 14, No. 4, p. 41-43.
Clark, et al., "Nutritional treatment for acquired immunodeficiency virus-associated wasting using beta-hydroxy beta-methylbutyrate, glutamine, and arginine: a randomized, double-blind, placebo-controlled study," Journal of Parenteral and Enteral Nutrition, May 2000, vol. 24, No. 3, p. 133-139.
Ostaszewski, et al., "3-hydroxy-3-methylbuyric acid (HMB) in immunological reactions generated by nutritional allergy in guinea pigs," Veterinary Medicine, vol. 51, No. 2, 1995 (translation).
Office Action issued in Japanese Application No. 2007-504991, dated Jun. 21, 2011.
Office Action issued in Russian Application No. 2008129605, dated Jul. 5, 2011.
Examiner's First Report issued for New Zealand Patent Application No. 593182, dated Jun. 3, 2011.
Smith, et al., "Attenuation of Proteasome-Induced Proteolysis in Skeletal Muscle by B-hydroxy-B-methylbutyrate in Cancer-Induced Muscle Loss," Cancer Research, 2005, vol. 65(1), p. 277-283.
International Search Report and Written Opinion from PCT/US2011/039170, dated Aug. 3, 2011.
Aggarwal et al., "Suppression of the Nuclear Factor kB Activation Pathway by Spice-Derived Phytochemicals: Reasoning for Seasoning", Annals of the New York Academy of Science, vol. 1030, pp. 434-441 (2004).
Barber et al., "The effect of an oral nutritional supplement enriched with fish oil on weight-loss in patients with pancreatic cancer," British Journal of Cancer, 1999, pp. 80-86, vol. 81, No. 1.
Barnes et al., "NF-kappa B: a pivotal role in asthma and a new target for therapy", Trends in Pharmacological Sciences, 1997, pp. 46-50, vol. 18.
Beck et al., "Anticachectic and Antitumor Effect of Eicosapentaenoic Acid and Its Effect on Protein Turnover," Cancer Research, vol. 51, pp. 6089-6093 (1991).
Brennan et al., "Nitrogen Metabolism in Cancer Patients," Cancer Treatment Reports, vol. 65, Supplemental 5, pp. 67-78 (1981).
Evans et al., "Expression and activation of protein kinase C in eosinophils after allergen challenge," Am J Physiol Lung Cell Mole Physiol, vol. 277, pp. 233-239 (1999).
Examination Report for Malaysian App. PI20082097 dated Jul. 29, 2011.
Examination Report from NZ Patent Application No. 568611, dated Apr. 13, 2010.
Flakoll et al., "Effect of b-hydroxy-b-methylbutyrate, arginine and lysine supplementation on strength, functionality, body composition, and protein metabolism in elderly women," Nutrition, vol. 20, pp. 445-451 (2004).
Fuller et al., "Decreasing male broiler mortality by feeding the leucine catabolite b-hydroxy-b-methylbutyrate," Poult. Sci., vol. 73, Supplemental 1, p. 93 (1994).
Gallagher et al., "B-hydroxy-b-methylbutyrate ingestion, Part 1: Effects on strength and fat free mass," Med. Sci. Sports Exerc, vol. 32, No. 12, pp. 2109-2115 (2000).
Gallagher et al., "b-hydroxy-b-methylbutyrate ingestion, Part II: effects on hematology, hepatic and renal function," Med. Sci. Sports Exerc., vol. 32, No. 12, pp. 2116-2119 (2000).
HMB, www.interactivenutrition.com, last visited Dec. 29, 2004.
International Search Report and Written Opinion for PCT/US2005/007951, dated Aug. 24, 2006.
International Search Report and Written Opinion for PCT/US2006/048303, dated May 6, 2008.
Jowko et al., "Creatine and b-hydroxy-b-methylbutyrate (HMB) additively increase lean body mass and muscle strength during a weight-training program", Nutrition, vol. 17, pp. 558-566 (2001).
Juven product information, http://abbottnutrition.com/Products/Juven, 5 pages, dated 2010.
Kaizen HMB, www.bodybuilding.com, last visited Dec. 29, 2004.

(56) References Cited

OTHER PUBLICATIONS

Kisner, "The Nutrition of the Cancer Patient," Cancer Treatment Reports, vol. 65, Supplemental 5, pp. 1-2 (1981).
Knitter et al., "Effects of b-hydroxy-b-methylbutyrate on muscle damage after a prolonged run," J. Appl. Physiol., vol. 89, pp. 1340-1344 (2000).
Lentsch et al., "Activation and Regulation of NFkB during Acute Inflammation," Clin. Chem. Lab. Med., vol. 37, No. 3, pp. 205-208 (1999).
Levenhangen et al., "Arginine, Lysine, and b-hydroxymethylbutyrate (HMB) Supplementation Enhances the Efficiency of Protein Synthesis in Elderly Females," Nutrition Week Abstracts, vol. 75, pp. 411S-412S (2002).
Macchi et al., "Influence of co-ingestion of glucose on b-hydroxy-b-methylbutyrate (HMB) metabolism in humans," FASEB J., p. A909 (1999).
Miller et al., "The effect of intensive training and b-hydroxy-b-methylbutyrate (HMB) on the physiological response to exercise in horses." FASEB J., p. A290 (1997).
Milne et al., "Do Routine Oral Protein and Energy Supplements Improve Survival and Reduce Length of Hospital Stay for Elderly People," Nutrition Week Abstracts, p. 412S (2002).
Moschini et al., "Effect of feeding b-hydroxy-b-methylbutyrate (HMB) on leucine and fat metabolism in mammary gland," FASEB J., p. A70 (1993).
Nissen et al., "b-hydroxy-b-methylbutyrate (HMB) supplementation in humans is safe and may decrease cardiovascular risk factors," J. Nutr., vol. 130, pp. 1937-1945 (2000).
Nissen et al., "Colostral milk fat percentage and pig performance are enhanced by feeding the leucine metabolite bhydroxy-b-methylbutyrate to sows," J. Anim. Sci., vol. 72, pp. 2331-2337 (1994).
Nissen et al., "Effect of b-hydroxy-b-methylbutyrate (HMB) supplementation of strength and body composition of trained and untrained males undergoing intense resistance training," FASEB J., p. A287 (1996).
Nissen et al., "Effect of dietary supplements on lean mass and strength gains with resistance exercise: A meta analysis," J. Appl. Physiol., vol. 94, pp. 651-659 (2003).
Nissen et al., "Effect of feeding b-hydroxy-b-methylbutyrate (HMB) on body composition and strength of women," FASEB J., p. A150 (1997).
Nissen et al., "Effect of leucine metabolite b-hydroxy-b-methylbutyrate on muscle metabolism during resistance-exercise training," J. Appl. Physiol., vol. 81, No. 5, pp. 2095-2104 (1996).
Nissen et al., "Nutritional role of the leucine metabolite b-hydroxy-b-methylbutyrate (HMB)," J. Nutr. Biochem., vol. 8, pp. 300-311 (1997).
Nissen et al., "The effect of b-hydroxy-b-methylbutyrate on growth, mortality and cacass qualitiies of broiler chickens," Poultry Science, vol. 71, pp. 137-155 (1994).
Nissen et al., "The effects of the leucine catabolite, b-hydroxy-b-methylbutyrate (HMB), on the growth and health of growing lambs," J. Anim. Sci., p. 243 (1994).
Nonnecke et al., "Leucine and its Catabolites After Mitogen-Stimulated DNA Synthesis by Bovine Lymphocytes," J. Nutr., vol. 121, pp. 1665-1672 (1991).
Office Action for U.S. Appl. No. 11/025,466, dated Oct. 4, 2010.
Office Action for U.S. Appl. No. 11/025,466, dated Dec. 5, 2008.
Office Action for U.S. Appl. No. 11/025,466, dated Apr. 14, 2010.
Office Action for U.S. Appl. No. 11/025,466, dated Apr. 6, 2011.
Office Action for U.S. Appl. No. 11/025,466, dated May 5, 2008.
Office Action for U.S. Appl. No. 11/025,466, dated Jun. 25, 2009.
Office Action for U.S. Appl. No. 11/025,466, dated Aug. 17, 2007.
Office Action for U.S. Appl. No. 11/025,466, dated Sep. 8, 2011.
Office Action for U.S. Appl. No. 11/641,978, dated Oct. 20, 2009.
Office Action for U.S. Appl. No. 11/641,978, dated Feb. 26, 2008.
Office Action for U.S. Appl. No. 11/641,978, dated Mar. 3, 2009.
Office Action for U.S. Appl. No. 11/641,978, dated Jun. 7, 2010.

Office Action from Chinese Patent Application No. 200680047936.3, dated Feb. 24, 2011.
Office Action from Chinese Patent Application No. 200680047936.3, dated May 25, 2010.
Office action issued in Chinese App. No. 200580009569.0, dated Jun. 28, 2010.
Office action issued in Taiwan App. No. 094109357, dated Dec. 2, 2010.
Oliver et al., "Airway Smooth Muscle and Asthma," Allergology International, vol. 55, pp. 215-223 (2006).
Ostaszewski et al., "3-Hydroxy-3-Methylbutyrate (HMB) Fed in the Water Enhance Immune Response in Young Broilers," Abstract 96, . 25.
Ostaszewski et al., "The immunomodulating activity of dietary 3-hydroxy-3-methylbutyrate (HMB) in weaning pigs, "J. Anim. Sci., vol. 81, Supplemental 1, p. 136 (1998).
Ostaszewski et al., "The leucine metabolite 3-hydroxy-3-methylbutyrate (HMB) modifies protein turnover in muscles of laboratory rates and domestic chickens in vitro," J. Anim. Physiol. A. Anim. Nutr. 84, pp. 1-8 (2000).
Ostaszewski et al., "The effect of the leucine metabolite 3-hydroxy 3-methylbutyrate (HMB) on muscle protein synthesis and protein breakdown in chick and rat muscle," Journal of Animal Science, vol. 74, Supplemental 1, p. 138 (1996).
Ostaszewski et al., "Dietary supplementation of 3-hydroxy-3-methylbutyrate improved catch-up growth in underfed lambs," Ann. Zootech , vol. 43, p. 308 (1994).
Panton et al., "Effect of b-hydroxy-b-methylbutyrate and resistance training on strength and functional ability in the elderly," Medicine & Science in Sports & Exercise, p. S194 (1998).
Panton et al., "Nutritional supplementation of the leucine metabolite b-hydroxy-b-methylbutyrate (HMB) during resistance training," Nutrition, vol. 16, pp. 734-739 (2000).
Papet et al., "The effect of a high dose of 3-hydroxy-3-methylbutyrate on protein metabolism in growing lambs," Br. J. Nutr., vol. 77, pp. 885-896 (1997).
Perkins et al., "Good cop, bad cop: the different faces of NF-kB," Cell Death and Differentiation, vol. 13, pp. 759-772 (2006).
Peterson et al., "Enhancement of cellular and humoral immunity in young broilers by the dietary supplementation of b-hydroxy-b-methylbutyrate," Immunopharmacology and Immunotoxicity, vol. 21, No. 2, pp. 307-330 (1999).
Peterson et al., "In Vitro Exposure with B-Hydroxy-B-Methylbutyrate Enhances Chicken Macrophage Growth and Function," Vetrinary Immunology and Immunopathology, vol. 67, pp. 67-78 (1999).
Porter et al., "Sustained NFAT Signaling Promotes a Th1-like Pattern of Gene Expression in Primary Murine CD4+ T Cells," Journal of Immunology, vol. 168, pp. 4936-4945 (2002).
Rathbacher et al., "Safety of a nutritional mixture of b-hydroxy-b-methylbutyrate (HMB), glutamine and arginine in healthy young adults and patients with AIDS," JPEN 23(1): S10 (1999).
Rathmacher et al., "The effect of the leucine metabolite b-hydroxy-b-methylbutyrate on lean body mass and muscle strength during prolonged bedrest," FASEB J., p. A909.
Rothmacher et al., "Supplementation with a combination of beta-hydroxy-beta-methylbutyrate (HMB), arginine, and glutamine is safe and could improve hematological parameters," Journal of Parenteral and Enternal Nutrition, vol. 28, No. 2, p. 6575 (2004).
Sandberg et al., "Effect of b-hydroxy-b-methylbutyrate on the physiological response to exercise and conditioning in horses," Journal of Animal Science, p. 198 (1997).
Sandberg et al., "The Effect of Intensive Training and b-hydroxy-b-methylbutyrate (HMB) on Muscle Glycogen concentration in the Horse," Journal of Animal Science, vol. 76, Supplemental 1, p. 175 (1998).
Siwicki et al., "Immunomodulating effect of 3-hydroxy-3-methylbutyrate (HMB) on the nonspecific cellular and humaoral defense mechanisms in rainbow trout (*Oncorhynchus nykiss*)," Journal of Animal Science, vol. 76, Supplemental 1, p. 137, (1998).

(56) References Cited

OTHER PUBLICATIONS

Siwicki et al., "In Vitro Effects of 3-Hydroxy-3-methylbutyrate (HMB) on measures of immune function and immunocompetence in fish," Journal of Animal Science, vol. 76, Supplemental 1, p. 136 (1998).
Siwicki et al., "Influence of 3-hydroxy-3-methylbutyrate on specific cellular immune response after in vitro and in vivo immunization with Yersinia ruckeri antifen," Journal of Animal Science, vol. 76, Supplemental 1, p. 136 (1998).
Smith et al., "Mechanisms of the attenuation of proteolysis-inducing factor stimulated protein degradation in muscle by beta-hydroxy-beta-methylbutyrate." Cancer Research, pp. 8731-8735 (2004).
Talleyrand et al., "Effect of feeding b-hydroxy-b-methylbutyrate on immune function in stressed calves," FASEB J, p. A951 (1994).
Talleyrand et al., "Uptake and output of the leucine metabolite b-hydroxy-b-methylbutyrate (HMB) across the legs of pigs," FASEB J., p. A71 (1993).
Tisdale et al., "Inhibition of Weight Loss by w-3 Fatty Acids in an Experimental Cachexia Model," Cancer Research, vol. 50, pp. 5002-5026 (1990).
Van Koevering et al., "Effect of b-hydroxy-b-methylbutyrate on the health and performance of shipping-stressed calves," the Oklahoma State Animal Science Research Report, pp. 312-316 (1993).
Van Koevering et al., "Oxidation of leucine and a-ketoisocaproate to b-hydroxy-b-methylbutyrate in vivo," American Journal of Physiology, pp. E27-E31 (1992).
Vukovich et al., "Body composition of 70-year-old adults responds to dietary beta-hydroxy beta-methylbutyrate similarly to that of young adults," Journal of Nutrition, vol. 131, No. 7, pp. 2049-2052 (2001).
Vukovich et al., "Effect of beta-hydroxy beta-methylbutyrate on the onset of blood lactate accumulation and VO2 peak in endurance-trained cyclists," J. Strength & Conditioning Res., vol. 15, No. 4, pp. 491-497 (2001).
Vukovich et al., "The effect of dietary b-hydroxy-b-methylbutyrate (HMB) on strength gains and body composition in older adults," FASEB J., p. A376 (1997).
Williams et al., "Effect of a specialized amino acid mixture on human collagen deposition," Annals of Surgery, vol. 236, No. 3, pp. 369-375 (2002).
Witte et al., "Nutritional abnormalities contributing to cachexia in chronic illness," International Journal of Cardiology, vol. 85, pp. 23-31 (2002).
Zachwieja et al., "Effect of the Leucine Metabolite b-hydroxy-b-methylbutyrate on muscle protein synthesis during prolonged bedrest," FASEB Abstracts, p. A1025 (1999).
Zhang et al., "Change in plasma b-hydroxy-b-methylbutyrate (HMB) by feeding leucine, a-ketiusicaoriate and isovaleric acid to pigs," FASEB J., p. A392 (1993).
Examination Report for Vietnam Application No. 1-2006-01765, issued Aug. 18, 2011.
Andela, et al., "NFkappaB: a pivotal transcription factor in prostate cancer metastasis to bone," Clinical Orthopaedics and Related Research, vol. 415S, pp. 875-885 (2003).
Andrews, et al. "A rapid micropreparation technique for extraction of DNA-binding proteins from limiting numbers of mammalian cells," Nucleic Acids Res., vol. 19, No. 9, p. 2499 (1991).
Battaini, "Protein kinase C isoforms as therapeutic targets in nervous systemdisease states," Pharmacological Research, vol. 44, No. 5, pp. 353-361 (2001).
Bibby et al., "Characterization of a transplantable adenocarcinoma of the mouse colon producing cachexia in recipient animals," J. Natl. Cancer Inst., vol. 78, No. 3, pp. 539-546 (1987).
Carter, "Protein Kinase C as a drug target: Implications for drug or diet prevention and treatment of cancer," Current Drug Targets, vol. 12, No. 2, pp. 163-183 (2000).
Coffman et al.,"Syntheses by Free-radical Reactions. V. A New Synthesis of Carboxylic Acids", J. Am. Chem. Soc., vol. 80, pp. 2282-2887 (1958).

Delfino, "Hormonal Regulation of the NF-kappaB signaling pathway," Molecular and Cellular Endocrinology, vol. 157, Nos. 1-2, pp. 1-9 (1999).
Dentener et al., "Systemic anti-inflammatory mediators in COPD: increase in soluble interleukin 1 receptor II during treatment of exacerbations," Thorax, vol. 56, No. 9, pp. 721-726 (2001).
Examiner's 2nd Report issued in New Zealand Application No. 568611, dated Jun. 3, 2011.
Fenteany et al., "Lactacystin, proteasome function and cell fate," J. Biol. Chem., vol. 273, No. 15, pp. 8545-8548 (1998).
Frank, "Potential new medical therapies for diabetic retinopathy: protein kinase C inhibitors," American Journal of Opthamology, vol. 133, No. 5, pp. 693-698 (2002).
Goekijan, "Protein kinase C in the treatment of disease: Signal transduction pathways, inhibitors, and agents in development," Current Medical Chemistry, vol. 6, No. 9, pp. 877-903 (1999).
Gomes-Marcondes et al., "Development of an in-vitro model system to investigate the mechanism of muscle protein catabolism induced by proteolysis-inducing factor," British Journal of Cancer, vol. 86, No. 10, pp. 1628-1633 (2002).
Jagoe, "What do we really know about the ubiquitin-proteasome pathway in muscle atrophy?" Current Opinion in Clinical Nutrition and Metabolic Care, vol. 4, No. 3, pp. 183-190 (2001).
Meier, "Protein kinase C activation and its pharmacological inhibition in vascular disease," Vascular Medicine, vol. 5, No. 3, pp. 173-185 (2000).
Moscat, "NF-kappaB activation by protein kinase C isoforms and B-cell function," Embo Reports, vol. 4, No. 1, pp. 31-36 (2003).
O'Brianne et al., "The tumor promoter receptor protein kinase C: A novel target for chemoprevention and therapy of human colon cancer," Prog. Clin. Bic). Res., vol. 391, pp. 117-120 (1995).
Orino et al., "ATP-dependent reversible association of proteasomes with mutliple protein components to form 26S complexes that degrade ubiquitinated proteins in human HL-60 cells," FEBS Letters, vol. 284, No. 2, pp. 206-210 (1991).
Ostaszewski et al., "3-hydroxy-3-methylbutyrate and 2-oxoisocaproate effect body composition and cholestreol concentration in rabbits." Journal of Animal Physiology and Animal Nutrition, vol. 79, pp. 135-145 (1998).
Schols, "Evidence for a relation between metabolic derangements and increased levels of inflammatory mediators in a subgroup of patients with chronic obstructive pulmonary disease," Thorax, vol. 51, No. 8, pp. 819-824 (1996).
Schols, "Pulmonary cachexia," International Journal of Cardiology, vol. 85, No. 1, pp. 101-110 (2002).
Smart et al, "Polyclonal and allergen-induced cytokine responses in adults . . . " Journal of Allergy and Clinical Immunology, vol. 110, pp. 45-46 (2002).
Smith et al., "Effect of a cancer cachectic factor on protein synthesis/degradation in murine C2C12 myoblasts: modulation by eicosapentaenoic acid," Cancer Research, vol. 59, No. 21, pp. 5507-5513 (1999).
Smith et al., "Signal transduction pathways involved in proteolysis-inducing factor induced proteasome expression in murine myotubes," British Journal of Cancer, vol. 89, No. 9, pp. 1783-1788 (2003).
Takabatake et al., "Circulating leptin in patients with chronic obstructive pulmonary disease," American Journal of Respiratory and Critical Care Medicine, vol. 159, pp. 1215-1219 (1999).
Teixeira et al., "The role of interferon-c on immune and allergic responses . . . ," Mem. Inst. Oswaldo Cruz, vol. 100, pp. 137-144 (2005).
Todorov et al., "Characterization of a cancer cachectic factor," Nature, vol. 379, No. 6567, pp. 739-742 (1996).
Todorov et al., "Induction of muscle protein degradation and weight loss by a tumor product," Cancer Research, vol. 56, No. 6, pp. 1256-1261 (1996).
Toker, "Signaling through protein kinase C," Frontiers in Bioscience, vol. 3, pp. 1134-1147 (1998).
Van Koevering et al., "Effects of b-hydroxy-b-methylbutyrate on performance and carcass quality of feedlot steers." Journal of Animal Science, vol. 72, pp. 1927-1935 (1994).

(56) References Cited

OTHER PUBLICATIONS

Waalkes, "A fluorometric method for the estimation of tyrosine in plasma and tissues," Journal of Laboratory and Clinical Medicine, vol. 50, No. 5, pp. 733-736 (1957).
Watchorn et al., "Proteolysis-inducing factor regulates hepatic gene expression via the transcriptionfactor NF-kappaB and STST3," FASEB Journal, vol. 15, No. 3, pp. 562-564 (2001).
Whitehouse et al., "Induction of protein catabolism in myotubes by 15(S)-hydroxyeicosatetraenoic acid through increased expression of the ubiquitin-proteasome pathway," British Journal of Cancer, vol. 89, No. 4, pp. 737-745 (2003).
Whitehouse et al., "Increased expression of the ubiquitin-proteosome pathway in murine myotubes by proteolysis-inducing factor (PIF) is associated with activation of the transcription factor NF-kappaB," British Journal of Cancer, vol. 89, No. 6, pp. 1116-1122 (2003).
Wolf et al., "The mitogen-activated protein kinase signaling cascade: from bench to bedside," IMAJ, vol. 4, No. 8, pp. 641-647 (2002).
Haumann, "Structured Lipids Allow Fat Tailoring," International News on Fats, Oils, and Related Materials, vol. 8(10), pp. 1004-1011 (1997).
Ho et al., "Antioxidants, NFkappaB activation and diabetogenesis," Proceedings of the Society for Experimental Biology and Medicine, vol. 222, No. 3, pp. 205-213 (1999).
Kutsuzawa et al., "Muscle energy metabolism and nutritional status in patients with chronic obstructive pulmonary disease," American Journal of Respiratory and Critical Care Medicine, vol. 152, No. 2, pp. 647-652 (1995).
Lorite et al., "Activation of a TP-ubiquita-dependent proteolysis in skeletal muscle in vivo and murine myoblasts in vitro by a proteolysis-inducing factor (PIF)," British Journal of Cancer, vol. 85, No. 2, pp. 297-302 (2001).
Merck Index No. 1862, 2003.
Merck Index No. 5198, 2003.
Merck Index No. 7355, 2003.
Merck Index No. 9908, 2003.
Merck Index No. 9975, 2003.
Hanson, et al., "Seven days of muscle re-loading and voluntary wheel running following hindlimb suspension in mice restores running performance, muscle morphology and metrics of fatigue but not muscle strength," Muscle Res. Cell Motil., vol. 31, pp. 141-153 (2010).
European Search Report for App. 10186645.7-1216, dated Feb. 14, 2011.
Golubitskii, et al., "Stability of Ascorbic Acid in Aqueous and Aqueous-Organic Solutions for Quantitative Determination," J. Anal Chem., vol. 62, No. 8, pp. 742-747 (2007).
Puspitasari, et al., "Calcium Fortification of Cottage Cheese with Hydrocolloid Control of Bitter Flavor Defects," J. Dairy Sci., vol. 74, pp. 1-7 (1991).
Toelstede et al., "Sensomics Mapping and Identification of the Key Bitter Metabolites in Gouda Cheese," J Agric Food Chem, vol. 56, pp. 2795-2804 (2008).
Toelstede et al., "Quantitative Studies and Taste Re-Engineering Experiments Toward the Decoding of the Nonvolatile Sensometabolome of Gouda Cheese," J Agric Food Chem, vol. 56, pp. 5299-5307 (2008).
Tordoff, et al., "Vegetable Bitterness is Related to Calcium Content," Appitite, vol. 52, pp. 498-504 (2009).
Engel, et al., "Evolution of the Composition of a Selected Bitter Camembert Cheese During Ripening: Release and Migration of Taste-Active Compounds," J. Agric Food Chem, vol. 49, pp. 2940-2947 (2001).
Engel, et al., "Evolution of the Taste of a Bitter Camembert Cheese During Ripening: Characterization of a Matrix Effect," J. Agric Food Chem., vol. 49, pp. 2930-2939 (2001).
Gacs, et al., "Significance of Ca-Soap Formation for Calcium Absorption in the Rat," Gut, vol. 18, pp. 64-68 (1977).
Technical Information: HEC-3000 10-Step Water Purification System, Home Environment Center.
Case Study: Water Purification Plant Installed at New UK Power Station, Filtration & Separation (Dec. 2004).
Siu, et al., "Id2 and p53 participate in apoptosis during unloading—induced muscle atrophy," Am. J. Physiol. Cell. Physiol., vol. 288, C1058-C1073 (2005).
Ferrando, et al., "Prolonged bed rest decreases skeletal muscle and whole body protein synthesis," Am. J. Physiol. vol. 270, pp. E627-E633 (1996).
Kortebein, et al., "Effect of 10 days of Bed Rest on Skeletal Muscle in Healthy Older Adults," JAMA, vol. 297, pp. 1772-1774 (2007).
Zarzhevsky, et al., "Recovery of muscles of old rats after hindlimb immobilisation by external fixation is impaired compared with those of young rats," Exp. Gerontol., vol. 36, pp. 125-140 (2001).
Damjanac et al., "Dissociation of Akt/PKB and ribosomal S6 kinase signaling markers in a transgenic mouse model of Alzheimer's disease," Neurobiology of Disease, vol. 29(2), pp. 354-367 (2008).
Abbott, "HMB (Beta-hydroxy-beta-methylbutyrate): A Scientific Review," Apr. 2010, pp. 1-34, XP002670332, available at http://abbottnutrition.com/downloads/resourcecenter/hmb-a-scientific-review.pdf (last accessed Apr. 9, 2012).
"Lite Protein Drinks," Database GNPD (Online) Mintel, Mar. 2000, XP002670334, available at www.gnpd.com.
"Lite Protein Drink Mixes with GlycerLEAN," Database GNPD (Online) Mintel, Feb. 2002, XP002670335, available at www.gnpd.com.
"Lean DynamX," XP 002670342, available at http://www.fitpage.de/produicte/pd-1330122620.htm?categoryId=181 (last accessed Feb. 24, 2012) (5 pages total).
International Search Report and Written Opinion for International Application No. PCT/US2011/066096, dated Mar. 14, 2012.
Meletis et al., "Natural Supports for Gaining and Maintaining Muscle Mass," Alternative and Complementary Therapies, pp. 257-263 (2005).
Zhang et al., "Occurrence of beta-hydroxy-beta-methylbutyrate in foods and feeds," Faseb Journal, vol. 8(4-5), p. A464 (Abstract 2685) (1994).
English translation of Notice of Rejection in Japanese Application No. 2000-555603, dated Mar. 6, 2012.
Non-final Office Action for U.S. Appl. No. 13/016,059, dated Mar. 23, 2012.
English translation of Office Action for Taiwan Patent Application No. 095147808, dated Mar. 21, 2012.
Office Action issued in Philippines Patent Application No. 1-2008-501331, dated Apr. 4, 2012.
Office action issued in Chinese Patent Application No. 200580009596, dated Mar. 1, 2012.
Second Office Action issued in Japanese Patent Application No. 2007-504991, dated Mar. 13, 2012.
Examination Report issued in New Zealand Patent Application No. 599371, dated Apr. 20, 2012.
International Preliminary Report on Patentability for International Application No. PCT/US2011/022938, dated Jan. 25, 2012.
International Preliminary Report on Patentability for International Application No. PCT/US2011/022947, dated Feb. 15, 2012.
Office Action issued in U.S. Appl. No. 13/016,005, dated Jun. 1, 2012.
Examiner's First Report in Australian Patent Application No. 2006331950, dated Apr. 19, 2012.
Anonymous, "Reload Dietary Supplements," Database GNPD (Online) Mintel, May 2010, XP002676291, available at www.gnpd.com.
Charbonneau, "Recent case histories of food product-metal container interactions using scanning electron microscopy-x-ray microanalysis," Scanning, vol. 19(7), pp. 512-518 (1997).
International Search Report and Written Opinion for International Application No. PCT/US2012/024817, dated Jun. 6, 2012.
International Search Report and Written Opinion for International Application No. PCT/US2012/023767, dated Jun. 6, 2012.
Montanari et al., "Quality of Organic Coatings for Food Cans: Evaluation Techniques and Prospects of Improvement," Progress in Organic Coatings, vol. 29(1-4), pp. 159-165 (1996).

(56) References Cited

OTHER PUBLICATIONS

Final Office Action for U.S. Appl. No. 13/016,041, dated Jun. 8, 2012.
English translation of Office Action issued in Chinese Patent Application No. 201110084963, dated Mar. 30, 2012.
International Search Report and Written Opinion for International Application No. PCT/US2012/020941, dated Apr. 26, 2012.
Partial European Search Report for European Application No. 12382138.1, dated Jun. 14, 2012.
Portal et al., "Effect of HMB supplementation on body composition, fitness, hormonal profile and muscle damage indices," J. of Ped. Endo. & Meta., vol. 23(7), pp. 641-650 (2010).
Kornasio et al., "beta-hydroxy-beta-methylbutyrate (HMB) stimulates myogenic cell proliferation, differentiation and survivial via the MAPK/ERK and PI3K/Akt pathways," Biochimica et Biophysica Acta Molecular Cell Research, vol. 1793(5), pp. 755-763 (2009).
Zdychova et al., "Emerging role of Akt Kinase/ Protein Kinase B signaling in pathophysiology of Diabetes and its complications," Physiol. Res., vol. 54(1), pp. 1-16 (2005).
Tanaka et al., "Effects of the novel Foxo1 inhibitor AS1708727 on plasma glucose and triglyceride levels in diabetic db/db mice," Euro. Jour. Of Pharm., vol. 645 (1-3), pp. 185-191 (2010).
Nawa et al., "A novel Akt/PKB—interacting protein promotes cell adhesion and inhibits familial amyotrophic lateral sclerosis-linked mutant SOD1-induced neuronal death via inhibition of PP2A-mediated dephosphorylation of Akt/PKB," Cellular Signalling, vol. 20(3), pp. 493-505 (2008).
Burke, R., "Inhibition of mitogen-activated protein kinase and stimulation of Akt kinase signaling pathways: Two approaches with therapeutic potential in the treatment of neurodegenerative disease," Pharm. And Therap., vol. 114 (3), pp. 261-277 (2007).
Written Opinion from PCT/US2005/007951 dated Oct. 6, 2006.
Response to Office Action for U.S. Appl. No. 13/016,005 dated Apr. 27, 2012.
Amendment and Response with RCE for U.S. Appl. No. 13/016,005 dated Aug. 3, 2012.
Applicant-Initiated Interview Summary for U.S. Appl. No. 13/016,005 dated Sep. 6, 2012.
Non-final office action for U.S. Appl. No. 13/016,005 dated Mar. 28, 2013.
Office action in U.S. Appl. No. 13/016,248 dated Nov. 7, 2012.
Notice of Allowance for U.S. Appl. No. 13/016,248 dated Apr. 22, 2013.
Amendment A to U.S. Appl. No. 13/016,041 dated May 2, 2012.
Amendment with RCE for U.S. Appl. No. 13/016,041 dated Sep. 4, 2012.
Applicant-Initiated Interview Summary for U.S. Appl. No. 13/016,041 dated Sep. 5, 2012.
Office Action from U.S. Appl. No. 13/016,041 dated Apr. 1, 2013.
Amendment A for U.S. Appl. No. 13/016,059 dated Jun. 25, 2012.
Office action for U.S. Appl. No. 13/016,070 dated Dec. 18, 2012.
Amendment for U.S. Appl. No. 13/016,070 dated Mar. 7, 2013.
Final rejection for U.S. Appl. No. 13/016,070 dated Apr. 4, 2013.
Extended Search Report in EP Application No. 11187274.3 dated Jun. 28, 2012.
Office Action in EP Application No. 11187274.3 dated Aug. 6, 2012.
Reexamination Notice from Chinese Application No. 200580009596.0 dated Jul. 9, 2013.
English translation of Second Office Action for Chinese Application No. 20118007420.7 dated Jan. 16, 2014.
Intention to Grant in EP Application No. 11705722.4 dated Jan. 3, 2014.
Communication from EP Application No. 11705725.7 dated Jan. 24, 2014.
Intention to Grant in EP Application No. 11707733.9 dated Dec. 18, 2013.
Response to Office Action for U.S. Appl. No. 13/016,005 dated Mar. 20, 2014.
Apr. 10, 2014 Office Action acknowledging entry of Mar. 20, 2014 response to Dec. 27, 2013 Office Action for U.S. Appl. No. 13/016,005.
Final Office Action in U.S. Appl. No. 13/016,005 dated Apr. 10, 2014.
Applicant-Initiated Interview Summary in U.S. Appl. No. 13/016,005 dated Jun. 19, 2014.
Amendment in U.S. Appl. No. 13/016,070 dated Apr. 7, 2014.
Office Action in U.S. Appl. No. 13/016,070 dated May 21, 2014.
Office action issued in Canadian Application No. 2,785,522 dated May 1, 2014.
Office action issued in Canadian Application No. 2,785,523 dated May 21, 2014.
Office action issued in Canadian Application No. 2,785,528 dated May 14, 2014.
Office action in Canadian Application No. 2,801,339 dated May 26, 2014.
English translation of Second Office Action for CN Application No. 2011800286145 (PCT/US2011/039170) dated May 20, 2014 (received Jun. 9, 2014).
English translation of First Office Action for Chinese Application No. 20118007418.x (PCT/US2011/022938) dated Mar. 24, 2014.
English translation of Third Office Action for Chinese Application No. 20118007420.7 dated May 15, 2014.
Second Office Action for CN Application No. 201180007682.3 dated Mar. 18, 2014.
English translation of Second Office Action for Chinese Application No. 201180007700.8 dated Feb. 8, 2014 (received Mar. 13, 2014).
Decision to Grant in EP Application No. 11705722.4 dated Apr. 25, 2014.
Decision to Grant in EP Application No. 11707733.9 dated May 15, 2014.
Communication in EP Application No. 11726580.1 dated Mar. 24, 2014.
English translation of Gao Fucheng et al., "Microcapsulation granulation Technology," New and High Technology of Modern Food Engineering, China Light Industry Press, pp. 51-53 and 58 (May 31, 1997).
Amendment to Office Action for U.S. Appl. No. 13/016.248 dated Feb. 7, 2013.
Response to office action for U.S. Appl. No. 13/440,610 dated Apr. 23, 2013.
Office Action for U.S. Appl. No. 13/440,610 dated May 9, 2013.
First Office Action from Chilean Application No. 192-2011 dated Apr. 24, 2013.
Notice of Allowance in EP Application No. 11705722.4 dated Nov. 15. 2012.
Intention to Grant in EP Application No. 11705723.2 dated Apr. 25, 2013.
Intention to Grant in EP Application No. 11705724.0 dated Nov. 29, 2012.
Communication from EP Application No. 11705725.7 dated Sep. 5, 2012.
Communication from EP Application No. 11707733.9 dated Sep. 5, 2012.
Extended Search Report in EP Application No. 12382138.1 dated Oct. 16, 2012 (13 pages).
Translation of Notice of Rejection for Japanese Patent Application No. 2008-547409 dated Jun. 5, 2012.
Alon et al., "Supplementing with beta-hydroxy-beta-methylbutyrate (HMB) to build and maintain muscle mass: a review," Research Communications in Molecular Pathology and Pharmacology, vol. 111 (1-4), pp. 139-151 (2002).
"Body Core Strength" ("Calorie Facts"), pub. online Apr. 25, 2010, http://web.archive.org/web/20100425070417/http://bodycorestrength.com/calorie-facts/.
"Calorie Counter" (Calories in Infant Formula, Abbott Nutrition, Similac, Advance with iron, liquid concentrate, not reconstituted), pub. online Jan. 17, 2010. http://web.archive.org/web/20100117072138/http://acaloriecounter.com/food/infant-formula-abbott-nutrition-similac-advance-wth-iron-liquid-concentrated-not-reconstituted-formerly-ross-.

(56) References Cited

OTHER PUBLICATIONS

The Dairy Council ("The Nutritional Composition of Diary Products"), pub. online Jul. 2007—see pp. 3,5, and 7. The nutrional information from the 2002 summary edition of the Composition of Foods (Food Standards Agency (2002)) McCance and Widdowson's the Composition of Foods, 6th Summary Edition).
De Los Reyes, et al., "Overview of resistance training, diet, hormone replacement and nutritional supplements on age-related sarcopenia-a minireview," Res. Comm. in Mol. Path. and Pharm., vol. 113-114, pp. 159-170 (2003).
Gaurav, P., "Japan Ensure Wave—3 Replicate Report and Recommendation for Clinical Manufacture" *Apr. 28, 2009).
Google search—"How much fat is in skim milk?" http://www.google.com . . . ,=how+much+fat+is+in+skim&gs . . . , last accessed May 3, 2013.
"Milk Composition Proteins", "Milk Composition & Synthesis Resource Library", pub. online Oct. 19, 2009. http://web.archive.org/web/20091019072335/http://classes.ansci.illinois.edu/ansc438/milkcompsynth/milkcomp_protein.html (4438).
MacDonald et al., "Understanding and Managing Cancer Cachexia,", Journal of the American College of Surgeons, vol. 197(1), 2003, pp. 143-161.
Von Bockelmann, Bernhard et al., "Aseptic Packaging of Liquid Food Products: A Literature Review", Journal of Agricultural and Food Chemistry, May 1986, vol. 34, issue 3, pp. 384-392.
"Yahoo Answers" ("What age did you start giving your baby whole milk ?"), pub. online 2008. http://answers.yahoo.com/question/index?qid=20060819094659AA0urJT.
International Search Report for PCT/US2005/007951 dated Aug. 24, 2006.
Applicant-Initiated Interview Summary for U.S. Appl. No. 13/016,005 dated Jul. 29, 2013.
Amendment and Response to Office Action for U.S. Appl. No. 13/016,005 dated Jul. 29, 2013.
Amendment with RCE for U.S. Appl. No. 13/016,070 dated Jul. 2, 2013.
Office action in U.S. Appl. No. 13/440,610 dated Apr. 11, 2013.
Response to OA for U.S. Appl. No. 13/440,610 dated Aug. 9, 2013.
English translation of 1st Office Action for Chinese Application No. 201180006376.8 dated May 13, 2013.
English translation of First Office Action for Chinese Application No. 201180007418,x (PCT/US2011/022938) dated Jun. 7, 2013.
English translation of First Office Action for Chinese Application No. 20118007420.7 (PCT/US2011/022932) dated Jun. 5, 2013 (received Jul. 5, 2013).
English translation of First Office Action for CN Application No. 201180007682.3 dated May 31, 2013 (received Jul. 8, 2013).
English translation for First Office Action for CN Application No. 201180007700.8 dated May 28, 2013 (received Jul. 10, 2013).
Decision to Grant in EP Application No. 11705724.0 dated Jun. 13, 2013.
Huai, Ming Yan, "Progress in 2-4 methionine hydroxy butyric acid (HMB)," Foreign Animal Husbandry (Pigs and Poultry), Jun. 2003.
Rowlands, et al., "Effects of b-hydroxy-b-methylbutyrate supplementation during resistance training on strength, body composition, and muscle damage in trained and untrained young men: a meta-analysis," J. of Strength and Conditioning Research, 23(3) 2009, pp. 836-846.
Shen Hua, "Development in the aseptic package", China Packaging industry Mar. 31, 2006.
Xu Sheng, "Evaluation of safety of hydrogen peroxide sterilization in aseptic packaging systems", Beverage Industry, vol. 9, Issue 7 Dec. 31, 2006.
Final Office action for U.S. Appl. No. 13/016,005 dated Sep. 12, 2013.
Response in U.S. Appl. No. 13/016,005 dated Aug. 6, 2014.
Final Office Action in U.S. Appl. No. 13/016,005 dated Aug. 20, 2014.
Non Final Office Action for U.S. Appl. No. 13/016,059 dated Jul. 16, 2014.
Response for U.S. Appl. No. 13/016,059 dated Sep. 24, 2014.
Response to OA in U.S. Appl. No. 13/016,070 dated Aug. 19, 2014.
Final Office Action in U.S. Appl. No. 13/016,070 dated Sep. 16, 2014.
Notice of Allowance in U.S. Appl. No. 13/016,248 dated Oct. 7, 2014.
Response with RCE in U.S. Appl. No. 13/440,610 dated Mar. 6, 2014.
Non final office action for U.S. Appl. No. 13/440,610 dated Sep. 3, 2014.
Office action in Canadian Application No. 2,785,524 dated Jul. 28, 2014.
Office action in Canadian Application No. 2,785,526 dated Aug. 15, 2014.
English translation of Third Office Action for Chinese Application No. 20118007700.8 dated Aug. 21, 2014 (received Sep. 25, 2014).
Intention to Grant in EP Application No. 11705725.7 dated Jul. 11, 2014.
Office Action in JP Application No. 2012-551324 dated Aug. 5, 2014.
Office Action in JP Application No. 2012-551322 dated Aug. 5, 2014.
Office Action in MX Application No. MX/a/2012/008783 dated Sep. 12, 2014.
Office Action in MX Application No. MX/a/2012/008785 mailed Aug. 29, 2014.
Office Action in MX Application No. MX/a/2012/008786 mailed Sep. 3, 2014.
English translation of Office Action and Search Report in TW Application No. 100103536 dated Jun. 30, 2014.
Gharsallaoui et al., "Applications of spray-drying in microencapsulation of food ingredients: An overview,", Food Research International, 40 (2007) pp. 1107-1121.
http://www.pedialyte.com/thisispedialyte/variety.cfm dated Jul. 2004.
http://www.pediasure.com/homepage.cfm dated Mar. 2005.
English translation of Third Office Action for CN Application No. 201180028614.5 dated Sep. 29, 2014.
EESR in EP 14169084.2 dated Sep. 22, 2014.
Office Action in JP Application No. 2012-551325 date Sep. 2, 2014.
Office Action in JP Application No. 2012-551326 dated Sep. 2, 2014.
Office Action in JP Application No. 2012-551329 dated Sep. 2, 2014.
Notice of Appeal in U.S. Appl. No. 13/016,005 dated Nov. 20, 2014.
Intention to Grant in EP Application No. 11726580.1 dated Sep. 18, 2014.
Appeal Brief for U.S. Appl. No. 13/016,005 dated Jan. 29, 2015.
Final office action in U.S. Appl. No. 13/016,059 dated Jan. 20, 2015.
Request for Reconsideration in U.S. Appl. No. 13/016,070 dated Jan. 15, 2015.
Applicant-Initiated Interview in U.S. Appl. No. 13/440,610 dated Dec. 10, 2014.
Request for Reconsideration after Non-Final Rejection in U.S. Appl. No. 13/440,610 dated Jan. 5, 2015.
Final Office Action in U.S. Appl. No. 13/440,610 dated Jan. 30, 2015.
English translation of Fourth Office Action for Chinese Application No. 20118007420.7 dated Dec. 1, 2014.
Decision to Grant in EP Application No. 11705725.7 dated Dec. 18, 2014.
Office Action in JP Application No. 2013-514238 mailed Nov. 11, 2014.
Amendment with RCE for U.S. Appl. No. 13/016,059 dated Apr. 20, 2015.
Notice of Appeal in U.S. Appl. No. 13/016,070 dated Jun. 2, 2015.
Appellant's Brief Under 37 CFR § 41.37 dated Jun. 30, 2015 in U.S. Appl. No. 13/016,070.
Office Action in U.S. Appl. No. 14/043,470 dated Jun. 18, 2015.
Notice of Allowance in Canadian Application No. 2,785,524 dated Apr. 21, 2015.
English translation of Decision on Rejection for Chinese Application No. 20118007700.8 dated May 4, 2015.

(56) References Cited

OTHER PUBLICATIONS

Decision of Rejection for JP Application No. 2012-551324 dated Apr. 7, 2015 (rec'd translation May 20, 2015).
English translation of Second Office Action in JP Application No. 2012-551325 dated Jun. 30, 2015 (received Jul. 24, 2015).
English translation of Search Report in TW Application No. 100103533 dated Apr. 28, 2015.
English translation of Search Report in TW Application No. 100103535 dated Jul. 13, 2015.
English translation of Search Report in TW Application No. 100103537 dated May 2, 2015.
English translation of Office Action in TW Application No. 100103537 dated May 8, 2015.
Response to Notification of Non-Compliant Appeal Brief in U.S. Appl. No. 13/016,005 dated Apr. 2, 2015.
Office Action in U.S. Appl. No. 13/016,070 dated Mar. 3, 2015.
Office Action for CA Application No. 2,801,339 dated Feb. 27, 2015.
Decision of Rejection for CN Application No. 20118007418.x dated Jan. 16, 2015.
Decision to Grant in EP Application No. 11726580.1 dated Feb. 5, 2015.
English translation of second Office Action in TW Application No. 100103536 dated Oct. 17, 2014.
Response after Final with Terminal Disclaimer in U.S. Appl. No. 13/016,005, filed Dec. 9, 2013.
Non Final Office Action for U.S. Appl. No. 13/016,005 dated Dec. 27, 2013.
Notice of Abandonment for U.S. Appl. No. 13/016,041 dated Oct. 21, 2013.
Non-final office action for U.S. Appl. No. 13/016,070 dated Dec. 17, 2013.
Final Office Action in U.S. Appl. No. 13/440,610 dated Dec. 6, 2013.
English translation of First Office Action for CN Application No. 201180028614.5 (PCT/US2011/039170) dated Oct. 11, 2013 (received Nov. 20, 2013).
Communication in EP Application No. 11726580.1 dated Dec. 10, 2013.
First Substantive Examination Report for SA Application No. 111320139 received Dec. 19, 2013.
Examination Report for Singapore Application No. 201208825-8 dated Oct. 30, 2013 (received Dec. 10, 2013).
English translation of 2nd Office Action in Chinese Application No. 201180006376.8 dated Jan. 13, 2014.

\* cited by examiner

SUBSTANTIALLY CLEAR NUTRITIONAL LIQUIDS COMPRISING CALCIUM HMB AND SOLUBLE PROTEIN

CROSS REFERENCE TO RELATED APPLICATION

This application claims the benefit of U.S. Provisional Application No. 61/353,400 filed Jun. 10, 2010, which disclosure is incorporated by reference in its entirety.

FIELD OF THE DISCLOSURE

The present disclosure relates to substantially clear nutritional liquids comprising calcium beta-hydroxy-beta methylbutyrate (calcium HMB) and soluble protein. The present disclosure further relates to substantially clear nutritional liquids comprising calcium HMB and soluble protein and having a pH of from about 2.8 to about 4.6.

BACKGROUND OF THE DISCLOSURE

Nutritional supplements are widely commercially available and are generally intended to supplement other nutritional sources. Currently available nutritional supplements include both emulsified supplements (generally "milk-based" supplements) and non-emulsified supplements ("clear" supplements). Many individuals today prefer to utilize clear supplements as they can provide a thin, good-tasting and refreshing means of supplementing energy, protein, vitamins and minerals.

An important nutrient in nutritional formulations is calcium. Calcium is the most abundant mineral in the body. Calcium is required for muscle contraction, blood vessel expansion and contraction, secretion of hormones and enzymes, and transmitting impulses throughout the nervous system. It is also important for bones and teeth health, where it supports their structure.

Another important supplement for nutritional formulations is beta-hydroxy-beta-methylbutyrate (HMB). HMB is a naturally occurring amino acid metabolite that is often formulated into a variety of nutritional products and supplements. HMB is commonly used in such products to help build or maintain healthy muscle mass and strength in selected individuals.

HMB is a metabolite of the essential amino acid leucine and has been shown to modulate protein turnover and inhibit proteolysis. In most individuals, muscle converts approximately 5% of available leucine to HMB, thus producing about 0.2 to 0.4 grams of HMB per day for a 70 kg male. In studies where various kinds of stress were induced in animals, HMB supplementation increased lean mass. Clinical studies also suggest that HMB has at least two functions in recovery from illness or injury including protection of lean mass from stress-related damage and enhancement of protein synthesis. It has been suggested that HMB may also be useful in enhancing immune function, reducing the incidence or severity of allergy or asthma, reducing total serum cholesterol and low density lipoprotein cholesterol, increasing the aerobic capacity of muscle, and other uses.

Since HMB is most often used in individuals to support the development and maintenance of healthy muscle mass and strength, many HMB products have been formulated with additional nutrients that may also be helpful in promoting healthy muscle. Some of these HMB products contain additional nutrients such as fat, carbohydrate, protein, vitamins, minerals and so forth. Calcium HMB is the most commonly used form of HMB when formulated into oral nutritional products, which products include tablets, capsules, reconstitutable powders, and nutritional liquids and emulsions.

It has been found, however, that substantially clear nutritional liquids containing protein, calcium HMB, along with supplemental calcium in some cases, are not physically stable over time as soluble calcium species present in the system can interact with intact proteins resulting in protein aggregation that results in sediment, gelation, and/or coagulation defects in the resulting product. This is especially true for acidified shelf stable liquid beverages subjected to high heat, such as that of a retort sterilization process, during manufacturing for microbiological control.

There is therefore a need for substantially clear nutritional liquids comprising calcium HMB, supplemental calcium, and proteins that remain physically stable during shelf life.

SUMMARY OF THE DISCLOSURE

In one embodiment, the present disclosure is directed to a substantially clear nutritional liquid comprising calcium HMB and protein and having a pH of from about 2.8 to 4.6. From about 65% to 100% by weight of total protein is soluble protein.

Another embodiment of the present disclosure is directed to a substantially clear nutritional liquid comprising calcium HMB and protein and having a pH of from about 2.8 to 4.6. From about 65% to 100% by weight of total protein is soluble protein and the weight ratio of calcium HMB to soluble calcium is from 4.5:1 to 7.3:1.

Another embodiment of the present disclosure is directed to a substantially clear nutritional liquid comprising calcium HMB, protein, isomaltulose, beta-alanine, and Vitamin D and having a pH of from about 2.8 to 4.6. From about 65% to 100% by weight of total protein is soluble protein and the weight ratio of calcium HMB to soluble calcium is from 4.5:1 to 7.3:1. The Vitamin D is present in an amount up to about 1000 IU.

It has been discovered that lower pH substantially clear nutritional liquids comprising calcium HMB in combination with protein can be physically unstable over time, often resulting in the collection of excessive protein-containing and/or other sediments at the bottom of the liquid, thus reducing nutrient availability as well as the effective shelf life of the product.

It has now also been found that a substantially clear nutritional liquid including HMB and protein can be provided by formulating the liquid to have a pH of from about 2.8 to 4.6 and including soluble protein in an amount of from about 65% to 100% by weight of the total protein. Surprisingly, even at very high levels of calcium in the product, the protein remains stable and the liquid substantially clear under these conditions. Stability may be further improved if the clear nutritional liquid has a weight ratio of calcium HMB to soluble calcium of from 4.5:1 to 7.3:1. Soluble proteins of particular use in this regard include whey protein isolate, whey protein concentrate, casein hydrolysate, hydrolyzed collagen, and combinations thereof.

DETAILED DESCRIPTION OF THE DISCLOSURE

The substantially clear nutritional liquids of the present disclosure comprise water, calcium HMB and soluble protein and optionally beta-alanine, carbohydrates, vitamins, and minerals. The essential features of the substantially clear liquids, as well as some of the many optional variations and additions, are described in detail hereafter.

The term "substantially clear nutritional liquid" as used herein, unless otherwise specified, refers to a non-emulsified or similar other liquid having a visibly clear or translucent appearance, which liquid may and typically will have a thin or watery texture with a consistency similar to that of a clear juice and most typically having a viscosity of less than about 25 centipoise as determined by a Brookfield viscometer at 22° C. using a #1 spindle at 60 rpm.

The term "calcium HMB" as used herein, unless otherwise specified, refers to the calcium salt of beta-hydroxy-beta-methylbutyrate (also referred to as beta-dydroxyl-3-methyl butyric acid, beta-hydroxy isovaleric acid, or HMB), which is most typically in a monohydrate form. All weights, percentages, and concentrations as used herein to characterize calcium HMB are based on the weight of calcium HMB monohydrate, unless otherwise specified.

The terms "fat" and "oil" as used herein, unless otherwise specified, are used interchangeably to refer to lipid materials derived or processed from plants or animals. These terms also include synthetic lipid materials so long as such synthetic materials are suitable for oral administration to humans.

The term "shelf stable" as used herein, unless otherwise specified, refers to a substantially clear nutritional liquid that remains commercially stable after being packaged and then stored at 18-24° C. for at least 3 months, including from about 6 months to about 24 months, and also including from about 12 months to about 18 months.

The term "plastic" as used herein, unless otherwise specified, means food grade plastics approved by the U.S. Food and Drug Administration or other suitable regulatory group, some non-limiting examples of which include polyvinyl chlorides, polyethylene terephthalate, high density polyethylene, polypropylenes, polycarbonates, and so forth.

The terms "sterile", "sterilized" and "sterilization" as used herein, unless otherwise specified, refer to the reduction in transmissible agents such as fungi, bacteria, viruses, spore forms, and so forth, in food or on food grade surfaces to the extent necessary to render such foods suitable for human consumption. Sterilization processes may include various techniques involving the application of heat, peroxide or other chemicals, irradiation, high pressure, filtration, or combinations or variations thereof.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The various embodiments of the substantially clear nutritional liquids of the present disclosure may also be substantially free of any optional or selected essential ingredient or feature described herein, provided that the remaining substantially clear nutritional liquid still contains all of the required ingredients or features as described herein. In this context, and unless otherwise specified, the term "substantially free" means that the selected substantially clear nutritional liquid contains less than a functional amount of the optional ingredient, typically less than about 1%, including less than about 0.5%, including less than about 0.1%, and also including zero percent, by weight of such optional or selected essential ingredient.

The substantially clear nutritional liquids and corresponding manufacturing methods of the present disclosure can comprise, consist of, or consist essentially of the essential elements of the disclosure as described herein, as well as any additional or optional element described herein or otherwise useful in substantially clear nutritional liquid applications.

Product Form

The substantially clear nutritional liquids of the present disclosure are thin liquids comprising at least protein, carbohydrate and calcium HMB as discussed below. The substantially clear nutritional liquids are substantially fat free; that is, the liquids are devoid of added fat except for that fat inherent to the raw materials or added fat at low concentrations to aid in the manufacture the liquid. In this context, the term "fat free" means that the liquid typically contains less than 1.0%, more typically less than 0.5%, and more typically less than 0.1%, including zero percent, fat by weight of the nutritional liquid. These substantially clear nutritional liquids are flowable or drinkable liquids at from about 1 to about 25° C.

The substantially clear nutritional liquids may be and typically are shelf-stable. The liquids typically contain up to about 95% by weight of water, including from about 50% to about 95%, also including from about 60% to about 90%, and also including from about 70% to about 85%, of water by weight of the substantially clear nutritional liquid.

The substantially clear nutritional liquids may be formulated with sufficient kinds and amounts of nutrients so as to provide a supplemental source of nutrition, or to provide a specialized nutritional liquid for use in individuals afflicted with specific diseases or conditions. These substantially clear nutritional liquids may thus have a variety of product densities, but most typically have a density greater than about 1.040 g/ml, including from 1.06 g/ml to 1.12 g/ml, and also including from about 1.085 g/ml to about 1.10 g/ml.

The substantially clear nutritional liquids may have a caloric density tailored to the nutritional needs of the ultimate user, although in most instances the liquids comprise from about 90 to about 500 kcal/240 ml, including from about 150 to about 350 kcal/240 ml, including from about 180 to about 350 kcal/240 ml and also including from about 250 to about 320 kcal/240 ml. In other embodiments, the substantially clear nutritional liquids comprise from about 90 to about 500 kcal/480 ml, including from about 150 to about 350 kcal/480 ml, and also including from about 250 to about 320 kcal/480 ml. These substantially clear nutritional liquids also comprise calcium HMB as described hereinafter, the amount of which most typically ranges from about 0.4 to about 3.0 gm/240 ml, including from about 0.75 to about 2.0 gm/240 ml, including about 1.5 gm/240 ml.

The substantially clear nutritional liquids have a pH ranging from about 2.8 to about 4.6, including from about 2.9 to about 4.2, and also including from about 3.1 to about 3.9. Within these pH ranges, the calcium HMB remains associated and as such, the interaction between the calcium and the protein in the formulation is minimized or avoided. This then minimizes or avoids the formation of sediment, gelation, and coagulation. Within this selected pH range, the undesirable sediment, gelation and coagulation is minimized or prevented even at temperatures greater than 180° F., which is the preferred minimum temperature for a suitable process for acidified products, as described below.

Although the serving size for the substantially clear nutritional liquid can vary depending upon a number of variables, a typical serving size ranges from about 100 to about 591 ml, including from about 150 to about 250 ml, including from about 190 ml to about 240 ml. Some specific serving sizes for the substantially clear nutritional liquid include 240 ml (8.1 ounce), 296 ml (10 ounce) and 480 ml (16 ounce).

Calcium HMB

The substantially clear nutritional liquids comprise HMB, and preferably calcium HMB, which means that the liquids are either formulated with the addition of calcium HMB, most typically as a monohydrate, or are otherwise prepared so as to contain calcium and HMB in the finished product. Any source of HMB is suitable for use herein provided that the finished product contains calcium and HMB, although such a source is preferably calcium HMB and is most typically added as such to the substantially clear nutritional liquids during formulation.

The term "added calcium HMB" as used herein means a calcium salt of HMB, most typically as monohydrate calcium salt of HMB, as the HMB source added to the substantially clear nutritional liquid.

Although calcium HMB monohydrate is the preferred source of HMB for use herein, other suitable sources may include HMB as the free acid, a salt, an anhydrous salt, an ester, a lactone, or other product forms that otherwise provide a bioavailable form of HMB from the substantially clear nutritional liquid. Non-limiting examples of suitable salts of HMB for use herein include HMB salts, hydrated or anhydrous, of sodium, potassium, magnesium, chromium, calcium, or other non-toxic salt form. Calcium HMB monohydrate is preferred and is commercially available from Technical Sourcing International (TSI) of Salt Lake City, Utah.

The concentration of calcium HMB in the substantially clear nutritional liquids may range up to about 10%, including from about 0.01% to about 8%, and also including from about 0.08% to about 5.0%, and also including from about 0.08% to about 3%, and also including from about 0.1% to about 2.5%, by weight of the substantially clear nutritional liquid. In some embodiments, the substantially clear nutritional liquids are formulated such that the liquid provides from about 0.5 grams to about 3.0 grams, including 1.5 grams of calcium HMB per 8.1 fluid ounces (240 ml).

Soluble Protein

The substantially clear nutritional liquids of the present disclosure may comprise selected amounts or ratios of soluble protein as defined herein to improve product performance and stability during shelf life.

The soluble protein may represent from about 65% to 100%, including from 80% to 100%, including from about 85% to about 100%, including from about 90% to about 100%, including from about 95% to about 100%, and also including about 100%, by weight of the total protein in the substantially clear nutritional liquid. The concentration of soluble protein may range from at least about 0.5%, including from about 1% to about 30%, and also including from about 2% to about 15%, also including from about 3% to about 10%, and also including from about 3% to about 5%, by weight of the substantially clear nutritional liquid. In some embodiments, the substantially clear nutritional liquid provides at least about 5 grams, or even 6 grams, or even 7 grams, or even 8 grams, or even 9 grams, or even 10 grams of total protein per 8 fluid ounce serving.

The amount of soluble protein included in the substantially clear nutritional liquids may also be characterized as a weight ratio of soluble protein to calcium HMB, wherein substantially clear nutritional liquid includes a weight ratio of soluble protein to calcium HMB of at least about 3.0, including from about 4.0 to about 12.0, also including 6.1 to about 12, also including from about 7.0 to about 11.0, and also including from about 8.0 to about 10.0.

The term "soluble protein" as used herein, unless otherwise specified, refers to those proteins having a protein solubility of at least about 40%, including from 50% to 100%, and also including from 60% to 90%, as measured in accordance with the following process: (1) suspend protein ingredient in purified water at 5.00 g per 100 g of suspension; (2) adjust the pH of the suspension to 3.5 or the desired product pH (e.g., 4.6 or other) using HCl, Phosphoric Acid, Citric Acid or combinations thereof; (3) stir vigorously at room temperature (20° C.-22° C.) for 60 minutes; (4) measure total protein in the suspension by any suitable technique (including the HPLC technique described below); (5) centrifuge an aliquot of the suspension at 31,000×g and at 20° C. for 1 hour; (6) measure the supernatant for protein by the selected technique as described in step (4); and (7) calculate protein solubility as the supernatant protein percentage of the total protein.

Protein concentration (per step 4 above) can be measured in the protein solubility process by any known or otherwise suitable method for determining such concentrations, many of which are well known in the analytical art. An example of one such suitable method is by HPLC analysis in accordance with the following specifications: (1) Column: Shodex KW-804 protein size exclusion chromatography column, Waters P/N WAT036613; (2) Mobile Phase: 0.05M $NaH_2PO_4$, 0.15M NaCl, pH=7.0; (3) Flow Rate: 0.3 mL/minute; (4) Temperature: 22° C.; (5) Detection: UV at 214 nm; (6) Injection: 10 µL; (7) Run Time: 90 minutes; (8) System Calibration: protein standard solutions prepared at 0.5-3.0 g/L in mobile phase; and (9) Sample Preparation: dilute to about 1.5 g/L protein with mobile phase.

Any soluble protein source is suitable for use herein provided that it meets the solubility requirement as defined herein, some non-limiting examples of which include whey protein concentrate (>90% solubility), whey protein isolate (>90% solubility), casein hydrolysate (>60% solubility), hydrolyzed collagen, combinations thereof. Non-soluble proteins may of course also be included in the substantially clear nutritional liquids described herein provided that the remaining soluble protein component is represented in accordance with the requirements as set forth herein. The composition may be substantially free of proteins other than the soluble protein as described herein.

Soluble protein suitable for use herein may also be characterized by the content of phosphoserine in the protein, wherein the soluble proteins in this context are defined as those proteins having at least about 100 mmoles, including from about 150 to 400 mmoles, including from about 200 to about 350 mmoles, and also including from about 250 to about 350 mmoles, of phosphoserine per kilogram of protein.

When the soluble protein is defined in terms of phosphoserine content, it has been found that the weight ratio of the soluble protein (with the defined phosphoserine content) to the calcium HMB may be at least about 3:1, including at least about 5:1, and also including at least about 7:1, and also including from about 9:1 to about 30:1. In this context, the proteins having the requisite content of phosphoserine are most typically in the form of monovalent caseinate salts such as sodium caseinate, potassium caseinate, and combinations thereof.

In one embodiment, the soluble protein may also be characterized by a mole ratio of monovalent caseinate phosphoserine to calcium HMB monohydrate of least about 0.2, including from about 0.2 to about 2.0, and also including from about 0.25 to 1.7.

It should be understood, however, that any phosphoserine-containing protein may be suitable for use herein provided that it has the requisite phosphoserine content and that the phosphoserine used in calculating the ratios are not bound, complexed, or otherwise attached to a polyvalent cation such as calcium or magnesium.

It should also be noted that alternative definitions as described herein for soluble proteins may include proteins that have little or no phosphoserine content, so that the soluble protein fraction of the compositions may include soluble protein with and/or without phosphoserine. The soluble protein for use herein may therefore be defined by any one or more of the soluble protein characterizations, separately or in combination.

The phosphoserine moieties within the protein may therefore be available for binding with the calcium released from the calcium HMB so that the above ratios of soluble protein to calcium HMB are the ratio of protein with phosphoserine moities that are unbound, unattached, or otherwise available to bind soluble calcium from the calcium HMB during formulation. It could be, for example, that a mixture of calcium caseinate and sodium caseinate are used in the composition, but the ratio of proteins defined by a phosphoserine content to calcium HMB is calculated based on the protein fraction from the sodium caseinate and additionally any protein from the calcium caseinate fraction that is not bound to calcium.

It should be noted, however, that any protein selected for use herein as a soluble protein must also meet the solubility testing requirements noted above even if the protein is whey protein concentrate, casein hydrolysate, or other typically soluble protein since protein solubility can vary significantly with the selection of raw material lots, sources, brands, and so forth.

Soluble Calcium

As noted above, it is generally desirable to minimize the amount of soluble calcium present in the substantially clear nutritional liquid to minimize the amount of interaction with the proteins and minimize the amount of sediment formed.

The substantially clear nutritional liquids of the present disclosure, however, comprise calcium as a desirable ingredient in the liquids suitable for use in developing or maintaining healthy muscle in targeted individuals, as well as for other benefits. Some or all of the calcium may be provided by the addition of calcium HMB as described herein. Any other calcium source, however, may be used provided that such other source is compatible with the essential elements of the substantially clear nutritional liquids.

The concentration of calcium in the substantially clear nutritional liquids typically exceeds about 10 mg/L, and may also include concentrations of from about 25 mg/L to about 3000 mg/L, also including from about 50 mg/L to about 500 mg/L, and also including from about 100 mg/L to about 300 mg/L.

To minimize the stability issues in the substantially clear nutritional liquids, the calcium is generally formulated so as to minimize the extent to which the calcium is solubilized in the liquids. As such, solubilized calcium concentrations in the liquids may be less than about 1500 mg/L, including less than about 1250 mg/L, also including from about 500 mg/L to about 1250 mg/L, and also including from about 200 mg/L to about 600 mg/L. In this context, the term "solubilized calcium" refers to free, ionized, or supernatant calcium in the liquid as measured at 20° C.

The calcium component of the substantially clear nutritional liquid may also be characterized by a solubilized calcium level that represents less than 900 mg/L, including less than 700 mg/L, and also including less than 600 mg/L, and also including from 400 mg/L to 700 mg/L of the liquid, wherein the weight ratio of calcium HMB to the solubilized calcium ranges from about 4.5 to about 7.3, including from about 4.5 to about 6, also including from about 5 to about 6.

Protein

In addition to the soluble protein as described above, in some embodiments of the present disclosure the substantially clear nutritional liquids may comprise one or more additional proteins such that the liquid includes both soluble and insoluble proteins. The total concentration of protein in the liquid (including all soluble and insoluble protein) may range from at least about 0.5%, including from about 1% to about 30%, and also including from about 2% to about 15%, also including from about 3% to about 10%, and also including from about 3% to about 5%, by weight of the substantially clear nutritional liquid.

Non-limiting examples of additional suitable protein or sources thereof for use in the substantially clear nutritional liquids include hydrolyzed or partially hydrolyzed proteins or protein sources, which may be derived from any known or otherwise suitable source such as milk (e.g., casein, whey), animal (e.g., meat, fish), cereal (e.g., rice, corn), vegetable (e.g., soy) or combinations thereof. Non-limiting examples of such proteins include milk protein isolates, milk protein concentrates as described herein, casein protein isolates, whey protein, whole cow's milk, partially or completely defatted milk, soy protein isolates, soy protein concentrates, combinations thereof, and so forth.

Carbohydrate

In addition to calcium HMB and protein, the substantially clear nutritional liquids of the present disclosure may include carbohydrates. Generally, the carbohydrate component of the substantially clear nutritional liquid is present in an amount of at least about 5%, including from about 10% to about 50%, including from about 10% to about 40%, including from about 10% to about 30%, including from about 20% to about 30% by weight of the substantially clear nutritional liquid.

Non-limiting examples of suitable carbohydrates or sources thereof for use in the substantially clear nutritional liquids described herein may include maltodextrin, hydrolyzed or modified starch or cornstarch, glucose polymers, corn syrup, corn syrup solids, rice-derived carbohydrates, sucrose, glucose, fructose, lactose, high fructose corn syrup, honey, sugar alcohols (e.g., maltitol, erythritol, sorbitol), artificial sweeteners (e.g., sucralose, acesulfame potassium, stevia) and combinations thereof.

Beta Alanine

The substantially clear nutritional liquids of the present disclosure may further comprise in some embodiments the amino acid beta alanine, which means that the substantially clear nutritional liquids are either formulated with the addition of beta alanine, or are otherwise prepared so as to contain beta alanine in the finished product.

Any source of beta alanine is suitable for use in the products described herein provided that the finished product contains beta alanine at the desired level. Such sources may and typically do include free beta alanine as well as other sources that provide free beta alanine in the nutritional liquid during or after formulation. However, although the present liquids may further comprise proteins or hydrolyzed proteins containing peptides having beta alanine moieties, the beta alanine from such peptide-bound moieties, if any, are not considered part of the beta alanine feature when defining the present disclosure. One suitable source of beta alanine is commercially available from Compounds Solutions (Escondido, Calif.).

The concentration of beta alanine in the substantially clear nutritional liquids may range from about 0.1% to about 3.0%, or even from about 0.1% to about 2.0%, or even from about 0.1% to about 1.0% or even from about 0.1% to about 0.33% by weight of the substantially clear nutritional liquid.

Isomaltulose

The substantially clear nutritional liquids of the present disclosure may further comprise isomaltulose, or other slow digesting carbohydrates such as sucromalt. Any source of isomaltulose is suitable for use herein provided it is suitable for use in a nutritional product and is otherwise compatible with the essential and optionally selected ingredients in the formulation.

The concentration of isomaltulose in the nutritional liquids may range from about 0.01% to about 10%, including from about 0.1% to about 7%, including from about 0.1% to about 2%, by weight of the nutritional liquid.

Vitamin D

The substantially clear nutritional liquids of the present disclosure may further comprise in some embodiments Vitamin D to help maintain and build healthy muscle in the targeted user. Suitable Vitamin D forms include Vitamin D2 (ergocalciferol) and Vitamin D3 (cholecalciferol), or other forms suitable for use in a liquid nutritional product. The amount of Vitamin D in the substantially clear nutritional liquid most typically ranges up to about 3000 IU, more typically up to about 2000 IU, more typically up to about 1000 IU, more typically from about 10 to about 600 IU, and more typically from about 50 to 400 IU, per serving of the substantially clear nutritional liquid.

Optional Ingredients

The substantially clear nutritional liquids described herein may further comprise other optional ingredients that may modify the physical, chemical, hedonic or processing characteristics of the products or serve as pharmaceutical or additional nutritional components when used in the targeted population. Many such optional ingredients are known or otherwise suitable for use in other nutritional products and may also be used in the clear nutritional liquids described herein, provided that such optional ingredients are safe and effective for oral administration and are compatible with the essential and other ingredients in the selected product form.

Non-limiting examples of such optional ingredients include preservatives, antioxidants, emulsifying agents, buffers, pharmaceutical actives, additional nutrients as described herein, colorants, flavors, thickening agents and stabilizers, and so forth.

The liquids may further comprise vitamins or related nutrients, non-limiting examples of which include vitamin A, vitamin E, vitamin K, thiamine, riboflavin, pyridoxine, vitamin B12, carotenoids, niacin, folic acid, pantothenic acid, biotin, vitamin C, choline, inositol, salts, and derivatives thereof, and combinations thereof.

The liquids may further comprise minerals, non-limiting examples of which include phosphorus, magnesium, iron, zinc, manganese, copper, sodium, potassium, molybdenum, chromium, selenium, chloride, and combinations thereof.

The liquids may also include one or more flavoring or masking agents. Suitable flavoring or masking agents include natural and artificial sweeteners, sodium sources such as sodium chloride, and hydrocolloids, such as guar gum, xanthan gum, carrageenan, gellan gum, gum acacia and combinations thereof.

Methods of Manufacture

The substantially clear nutritional liquids described herein may be manufactured by any known or otherwise suitable method for making acidic beverages, including acidic, shelf-stable beverages, including retort, aseptic filling, and hot fill process. In one suitable embodiment, a hot fill process as described below is utilized.

In one suitable embodiment, the protein component is first dissolved in water with a temperature ranging from room temperature (approx. 70° F.) up to 135° F., for example. Once the protein is dissolved and a slurry formed, the resulting slurry is adjusted into a pH range of from about 2.8 to about 4.2 using an appropriate acid system, such as for example phosphoric acid and citric acid.

A second slurry is prepared by dissolving the carbohydrate component, the calcium HMB, and optionally the beta alanine, in water at an elevated temperature such as 175° F., for example. Once the carbohydrate component is dissolved, the protein slurry and the carbohydrate slurry are homogenized and vitamins, minerals and/or other ingredients are added into the resulting slurry. Once a final homogenized slurry is prepared, the resulting slurry is heated to a temperature of at least about 180° F., desirably at least about 200° C., and held at that temperature for at least about 20 seconds to kill mold, bacteria, and yeast. Prior to filling a suitable plastic or other container with the hot liquid, the liquid may optionally be rapidly cooled to 140° F. to 150° F. By filling the hot liquid into the container, the container itself is also sterilized. Generally, during or after the filling of the hot liquid, the container is rotated so that the headspace area is also sterilized.

Methods of Use

The substantially clear nutritional liquids of the present disclosure may be utilized by any person who could benefit from the use of a substantially clear nutritional liquid including calcium HMB. The substantially clear nutritional liquid may be particularly suitable for individuals suffering from malnutrition and/or muscle wasting or suffering from conditions such as fat restrictive diets, cancer, disease related malnutrition, short bowel syndrome, inflammatory bowel syndrome, cachexia, as well as other conditions or diseases. The nutritional liquids are also suitable for use in healthy individuals, including athletes and other physically active individuals in whom the benefits of the beta alanine and calcium HMB for muscle health can be realized.

EXAMPLES

The following examples illustrate specific embodiments and or features of the substantially clear nutritional liquids of the present disclosure. The examples are given solely for the purpose of illustration and are not to be construed as limitations of the present disclosure, as many variations thereof are possible without departing from the spirit and scope of the disclosure. All exemplified amounts are weight percentages based upon the total weight of the composition, unless otherwise specified.

The exemplified compositions are shelf stable substantially clear nutritional liquids prepared in accordance with the manufacturing methods described herein, such that each exemplified composition is a hot filled product and then repeated again in new batches as an aseptically processed product. These compositions are substantially clear nutritional liquids that are packaged in 240 ml plastic containers and remain physically stable for 12-18 months after formulation/packaging at storage temperatures ranging from 1-25° C. Each formulation has a pH value of from 2.8 to 4.6.

Examples 1-4

Examples 1-4 illustrate substantially clear nutritional liquids including HMB and soluble protein of the present disclosure, the ingredients of which are listed in the table below. All ingredient amounts are listed as kilogram per 1000 kilogram batch of product, unless otherwise specified.

| Ingredient | Example 1 | Example 2 | Example 3 | Example 4 |
|---|---|---|---|---|
| Water | Q.S. | Q.S. | Q.S. | Q.S. |
| Sucrose | 109.0 | 109.0 | 0 | 54.5 |
| Isomaltulose | 0 | 0 | 109.0 | 54.5 |
| Whey Protein Isolate | 42.90 | 32.18 | 42.90 | 41.90 |
| Hydrolyzed Casein | 0 | 10.72 | 0 | 0 |
| Phosphoric Acid | 2.0 | 2.0 | 2.0 | 2.0 |
| Citric Acid | 1.4 | 1.4 | 1.4 | 1.4 |
| Calcium HMB | 5.69 | 5.69 | 5.69 | 5.69 |
| Flavor | 700 g | 700 g | 700 g | 700 g |
| Ascorbic Acid | 535 g | 535 g | 535 g | 535 g |
| Color | 400 g | 400 g | 400 g | 400 g |
| UTM/TM Premix | 230 g | 230 g | 230 g | 230 g |
| Zinc Sulfate monohydrate* | 52.1 g | 52.1 g | 52.1 g | 52.1 g |
| Ferrous Sulfate* | 40.8 g | 40.8 g | 40.8 g | 40.8 g |
| Citric Acid* | 14.2 g | 14.2 g | 14.2 g | 14.2 g |
| Manganese sulfate* | 13.0 | 13.0 | 13.0 | 13.0 |
| Copper Sulfate* | 7.1 g | 7.1 g | 7.1 g | 7.1 g |
| Chromium Chloride* | 430 mg | 430 mg | 430 mg | 430 mg |
| Sodium Molybdate* | 339 mg | 339 mg | 339 mg | 339 mg |
| Sodium Selenate* | 146 mg | 146 mg | 146 mg | 146 mg |
| Water Dispersible ADEK Premix | 178 g | 178 g | 178 g | 178 g |
| di-Alpha-Tocopheryl Acetate** | 45.3 g | 45.3 g | 45.3 g | 45.3 g |
| Vitamin A Palmitate** | 4.2 g | 4.2 g | 4.2 g | 4.2 g |
| Phylloquinone** | 127 mg | 127 mg | 127 mg | 127 mg |
| Vitamin D3** | 23 mg | 23 mg | 23 mg | 23 mg |
| Vitamin Premix | 37.9 g | 37.9 g | 37.9 g | 37.9 g |
| Niacinamide*** | 14.2 g | 14.2 g | 14.2 g | 14.2 g |
| d-Calcium pantothenate*** | 9.2 g | 9.2 g | 9.2 g | 9.2 g |
| Thiamine chloride hydro chloride*** | 2.4 g | 2.4 g | 2.4 g | 2.4 g |
| Pyridoxine hydrochloride*** | 2.3 g | 2.3 g | 2.3 g | 2.3 g |
| Riboflavin*** | 1.8 g | 1.8 g | 1.8 g | 1.8 g |
| Folic Acid*** | 350 mg | 350 mg | 350 mg | 350 mg |
| Biotin*** | 277 mg | 277 mg | 277 mg | 277 mg |
| Cyanocobalamin*** | 6.3 mg | 6.3 mg | 6.3 mg | 6.3 mg |
| Folic Acid | 1.3 g | 1.3 g | 1.3 g | 1.3 g |
| Potassium Iodide | 204 mg | 204 mg | 204 mg | 204 mg |
| Beta-Alanine | 0 | 0 | 0 | 1.0 |
| Features | | | | |
| Soluble protein/total protein (wt/wt) | 100% | 75% | 100% | 100% |

*UTM/TM Premix;
**ADEK Premix;
***WSV Vitamin Premix

Examples 5-8

Examples 5-8 illustrate substantially clear nutritional liquids of the present disclosure, the ingredients of which are listed in the table below. All ingredient amounts are listed as kg per 1000 kg batch of product, unless otherwise specified.

| Ingredient | Example 5 | Example 6 | Example 7 | Example 8 |
|---|---|---|---|---|
| Water | Q.S. | Q.S. | Q.S. | Q.S. |
| Sucrose | 190.0 | 190.0 | 0 | 90 |
| Isomaltulose | 0 | 0 | 190.0 | 90 |
| Whey Protein Concentrate (70%) | 49.5 | 32.17 | 32.17 | 18.5 |
| Hydrolyzed Casein | 0 | 12.38 | 12.38 | 0 |
| Phosphoric Acid (85%) | 2.33 | 2.33 | 2.33 | 2.33 |

-continued

| Ingredient | Example 5 | Example 6 | Example 7 | Example 8 |
|---|---|---|---|---|
| Citric Acid | 1.98 | 1.98 | 1.98 | 1.98 |
| Calcium HMB | 5.69 | 5.69 | 5.69 | 5.69 |
| Flavor | 700 g | 700 g | 700 g | 700 g |
| Ascorbic Acid | 535 g | 535 g | 535 g | 535 g |
| Color | 400 g | 400 g | 400 g | 400 g |
| UTM/TM Premix | 230 g | 230 g | 230 g | 230 g |
| Zinc Sulfate monohydrate* | 52.1 g | 52.1 g | 52.1 g | 52.1 g |
| Ferrous Sulfate* | 40.8 g | 40.8 g | 40.8 g | 40.8 g |
| Citric Acid* | 14.2 g | 14.2 g | 14.2 g | 14.2 g |
| Manganese sulfate* | 13.0 | 13.0 | 13.0 | 13.0 |
| Copper Sulfate* | 7.1 g | 7.1 g | 7.1 g | 7.1 g |
| Chromium Chloride* | 430 mg | 430 mg | 430 mg | 430 mg |
| Sodium Molybdate* | 339 mg | 339 mg | 339 mg | 339 mg |
| Sodium Selenate* | 146 mg | 146 mg | 146 mg | 146 mg |
| Water Dispersible ADEK Premix | 178 g | 178 g | 178 g | 178 g |
| di-Alpha-Tocopheryl Acetate** | 45.3 g | 45.3 g | 45.3 g | 45.3 g |
| Vitamin A Palmitate** | 4.2 g | 4.2 g | 4.2 g | 4.2 g |
| Phylloquinone** | 127 mg | 127 mg | 127 mg | 127 mg |
| Vitamin D3** | 23 mg | 23 mg | 23 mg | 23 mg |
| Vitamin Premix | 37.9 g | 37.9 g | 37.9 g | 37.9 g |
| Niacinamide*** | 14.2 g | 14.2 g | 14.2 g | 14.2 g |
| d-Calcium pantothenate*** | 9.2 g | 9.2 g | 9.2 g | 9.2 g |
| Thiamine chloride hydrochloride*** | 2.4 g | 2.4 g | 2.4 g | 2.4 g |
| Pyridoxine hydrochloride*** | 2.3 g | 2.3 g | 2.3 g | 2.3 g |
| Riboflavin*** | 1.8 g | 1.8 g | 1.8 g | 1.8 g |
| Folic Acid*** | 350 mg | 350 mg | 350 mg | 350 mg |
| Biotin*** | 277 mg | 277 mg | 277 mg | 277 mg |
| Cyanocobalamin*** | 6.3 mg | 6.3 mg | 6.3 mg | 6.3 mg |
| Folic Acid | 1.3 g | 1.3 g | 1.3 g | 1.3 g |
| Potassium Iodide | 204 mg | 204 mg | 204 mg | 204 mg |
| Beta-Alanine | 0 | 0 | 0 | 5.0 |
| Features | | | | |
| Soluble protein/total protein (wt/wt) | 100% | 75% | 75% | 100% |

*UTM/TM Premix;
**ADEK Premix;
***WSV Vitamin Premix

Example 9-12

Examples 9-12 illustrate substantially clear nutritional liquids including HMB and soluble protein of the present disclosure, the ingredients of which are listed in the table below. All ingredient amounts are listed as kilogram per 1000 kilogram batch of product, unless otherwise specified.

| Ingredient | Example 9 | Example 10 | Example 11 | Example 12 |
|---|---|---|---|---|
| Water | Q.S. | Q.S. | Q.S. | Q.S. |
| Sucrose | 196.0 | 196.0 | 0 | 98 |
| Isomaltulose | 0 | 0 | 190 | 98 |
| Hydrolyzed Collagen | 42.90 | 32.18 | 42.90 | 40.90 |
| Hydrolyzed Casein | 0 | 10.72 | 0 | 0 |
| Phosphoric Acid | 2.33 | 2.33 | 2.33 | 2.33 |
| Citric Acid | 1.98 | 1.98 | 1.98 | 1.98 |
| Calcium HMB | 5.69 | 5.69 | 5.69 | 5.69 |
| Flavor | 700 g | 700 g | 700 g | 700 g |
| Ascorbic Acid | 535 g | 535 g | 535 g | 535 g |
| Color | 400 g | 400 g | 400 g | 400 g |
| UTM/TM Premix | 230 g | 230 g | 230 g | 230 g |
| Zinc Sulfate monohydrate* | 52.1 g | 52.1 g | 52.1 g | 52.1 g |
| Ferrous Sulfate* | 40.8 g | 40.8 g | 40.8 g | 40.8 g |
| Citric Acid* | 14.2 g | 14.2 g | 14.2 g | 14.2 g |
| Manganese sulfate* | 13.0 | 13.0 | 13.0 | 13.0 |
| Copper Sulfate* | 7.1 g | 7.1 g | 7.1 g | 7.1 g |
| Chromium Chloride* | 430 mg | 430 mg | 430 mg | 430 mg |
| Sodium Molybdate* | 339 mg | 339 mg | 339 mg | 339 mg |
| Sodium Selenate* | 146 mg | 146 mg | 146 mg | 146 mg |
| Water Dispersible ADEK Premix | 178 g | 178 g | 178 g | 178 g |

-continued

| Ingredient | Example 9 | Example 10 | Example 11 | Example 12 |
|---|---|---|---|---|
| di-Alpha-Tocopheryl Acetate** | 45.3 g | 45.3 g | 45.3 g | 45.3 g |
| Vitamin A Palmitate** | 4.2 g | 4.2 g | 4.2 g | 4.2 g |
| Phylloquinone** | 127 mg | 127 mg | 127 mg | 127 mg |
| Vitamin D3** | 23 mg | 23 mg | 23 mg | 23 mg |
| Vitamin Premix | 37.9 g | 37.9 g | 37.9 g | 37.9 g |
| Niacinamide*** | 14.2 g | 14.2 g | 14.2 g | 14.2 g |
| d-Calcium pantothenate*** | 9.2 g | 9.2 g | 9.2 g | 9.2 g |
| Thiamine chloride hydrochloride*** | 2.4 g | 2.4 g | 2.4 g | 2.4 g |
| Pyridoxine hydrochloride*** | 2.3 g | 2.3 g | 2.3 g | 2.3 g |
| Riboflavin*** | 1.8 g | 1.8 g | 1.8 g | 1.8 g |
| Folic Acid*** | 350 mg | 350 mg | 350 mg | 350 mg |
| Biotin*** | 277 mg | 277 mg | 277 mg | 277 mg |
| Cyanocobalamin*** | 6.3 mg | 6.3 mg | 6.3 mg | 6.3 mg |
| Folic Acid | 1.3 g | 1.3* g | 1.3 g | 1.3 g |
| Potassium Iodide | 204 mg | 204 mg | 204 mg | 204 mg |
| Beta-Alanine | 0 | 0 | 0 | 2.0 |
| Features | | | | |
| Soluble protein/total protein (wt/wt) | 100% | 75% | 100% | 100% |

*UTM/TM Premix;
**ADEK Premix;
***WSV Vitamin Premix

What is claimed is:

1. A substantially clear nutritional liquid comprising calcium HMB and protein and having a pH of from about 2.8 to 4.6, wherein from about 85% to 100% by weight of total protein is soluble protein, wherein the soluble protein is at least one protein selected from the group consisting of whey protein concentrate, whey protein isolate, casein hydrolysate, hydrolyzed collagen, and combinations thereof, wherein the translucent nutritional liquid is shelf-stable and non-emulsified, wherein the translucent nutritional liquid has a viscosity or less than about 25 centipoise, and wherein the soluble protein includes a phosphoserine-containing protein having from about 100 to about 400 mmoles of phosphoserine per kilogram of the phosphoserine-containing protein.

2. The translucent nutritional liquid of claim 1 wherein the calcium HMB is from about 0.1% to about 5.0% by weight of the translucent nutritional liquid.

3. The translucent nutritional liquid of claim 1 wherein the calcium HMB is from about 0.1% to about 2.5% by weight of translucent nutritional liquid.

4. The translucent nutritional liquid of claim 1 wherein the translucent nutritional liquid comprises less than 1.0% by weight of fat.

5. The translucent nutritional liquid of claim 1 further comprising from about 0.1% to about 3.0% by weight of beta alanine.

6. The translucent nutritional liquid of claim 1 wherein the liquid has a pH of from 3.1 to 3.9.

7. The translucent nutritional liquid of claim 1 further including Vitamin D.

8. A substantially clear nutritional liquid comprising calcium HMB and protein and having a pH of from about 2.8 to 4.6, wherein from about 85% to 100% by weight of total protein is soluble protein and wherein the weight ratio of calcium HMB to soluble calcium is from 4.5:1 to 7.3:1, wherein the translucent nutritional liquid is shelf-stable and non-emulsified, wherein the translucent nutritional liquid has a viscosity of less than about 25 centipoise, and wherein the soluble protein includes a phosphoserine-containing protein having from about 100 to 400 mmoles of phosphoserine per kilogram of the phosphoserine-containing protein.

9. The translucent nutritional liquid of claim 8 wherein the soluble protein is at least one protein selected from the group consisting of whey protein concentrate, whey protein isolate, casein hydrolysate, hydrolyzed collagen, and combinations thereof.

10. The translucent nutritional liquid of claim 8 wherein the calcium HMB is from about 0.1% to about 2.5% by weight of translucent nutritional liquid.

11. The translucent nutritional liquid of claim 8 wherein the substantially nutritional liquid comprises less than 1.0% by weight of fat.

12. The translucent nutritional liquid of claim 8 further comprising from about 0.1% to about 3.0% by weight of beta alanine.

13. The translucent nutritional liquid of claim 8 wherein the liquid has a pH of from 3.1 to 3.9.

* * * * *

UNITED STATES PATENT AND TRADEMARK OFFICE
CERTIFICATE OF CORRECTION

| | | |
|---|---|---|
| PATENT NO. | : 9,521,859 B2 | Page 1 of 1 |
| APPLICATION NO. | : 13/151911 | |
| DATED | : December 20, 2016 | |
| INVENTOR(S) | : DeWille et al. | |

It is certified that error appears in the above-identified patent and that said Letters Patent is hereby corrected as shown below:

In the Claims

Claim 1, Column 15, Line 27, delete "substantially clear nutritional liquid" and insert --translucent nutritional liquid--;

Claim 8, Column 16, Line 28, delete "substantially clear nutritional liquid" and insert --translucent nutritional liquid--; and Claim 11, Column 16, Line 47, delete "substantially nutritional liquid" and insert --translucent nutritional liquid--.

Signed and Sealed this
Sixth Day of June, 2017

Michelle K. Lee
*Director of the United States Patent and Trademark Office*